United States Patent [19]

Terauchi et al.

[11] Patent Number: 5,592,398
[45] Date of Patent: Jan. 7, 1997

[54] MULTIPLE CHANNEL MULTIPLEXING APPARATUS

[75] Inventors: Ikuo Terauchi, Nara; Keiichi Teranishi, Hirakata; Mitsuhiro Kazahaya, Katano; Katsuyuki Taguchi, Hirakata, all of Japan

[73] Assignee: Matsushita Electric Industrial Co., Ltd., Kadoma, Japan

[21] Appl. No.: 257,656

[22] Filed: Jun. 9, 1994

[30] Foreign Application Priority Data

May 16, 1994 [JP] Japan ................................. 6-101086

[51] Int. Cl.⁶ ................................................. H04L 29/06
[52] U.S. Cl. .............................. 364/514 A; 364/514 R; 395/200.17
[58] Field of Search ................ 360/33.1, 48; 364/514 R, 364/514 A; 375/240, 241, 242, 253; 381/29; 395/2.1, 200

[56] References Cited

U.S. PATENT DOCUMENTS

| | | | |
|---|---|---|---|
| T104,003 | 3/1984 | Hall et al. ................... | 340/825.08 X |
| 2,878,316 | 3/1959 | Boothroyd ..................... | 375/240 X |
| 4,665,514 | 5/1987 | Ching et al. .................. | 370/60 |
| 4,914,526 | 4/1990 | Sakata et al. ................. | 360/48 X |
| 5,023,370 | 6/1991 | Sakata et al. ................. | 360/48 |
| 5,388,209 | 2/1995 | Akagiri ........................ | 395/2.1 X |
| 5,424,850 | 6/1995 | Inoue et al. .................. | 358/335 X |
| 5,434,797 | 7/1995 | Barris ......................... | 364/514 A |
| 5,438,643 | 8/1995 | Akagiri et al. ................ | 395/2.1 |
| 5,467,372 | 11/1995 | Nishitani ..................... | 375/244 |

FOREIGN PATENT DOCUMENTS

| | | |
|---|---|---|
| 0066947 | 12/1982 | European Pat. Off. . |
| 0402973 | 12/1990 | European Pat. Off. . |
| 2309087 | 11/1976 | France . |
| 32-07185 | 9/1991 | Japan . |
| 5-205405 | 8/1993 | Japan . |
| 6-61958 | 3/1994 | Japan . |
| 61-33015 | 5/1994 | Japan . |

OTHER PUBLICATIONS

"APTX100, Technical Data Sheet", *Audio Processing Technolgy*, (Section 1, pp. 1–28, Section 2, pp. 1–10). (corresponds to references 2 and 4 listed on this PTO–1449), No date.

"apt–X 100 Sub–band ADPCM Digital Audio Data Compression", *Audio Processing Technology*, pp. 1–76.

"Digital Audio Interface" of Standards of Electronic Industries Association of Japan, *Audio Technology Committee*, pp. 1–29, (Sep. 1987).

"APTX100ED Digital Audio Coding IC", *Audio Processing Technology*, No date.

*Primary Examiner*—Edward R. Cosimano
*Attorney, Agent, or Firm*—Ratner & Prestia

[57] ABSTRACT

A multiple channel multiplexing apparatus has a data compressor portion for producing compressed data, and a data expander portion for expanding the received compressed data. The data compressor portion has a data compression circuit for data compressing digital audio data and outputting the resulting data blocks, a sub-block divider for dividing the data blocks output from the data compression circuit into sub-blocks, a sub-block ID flag adding circuit for adding a sub-block identification flag identifying the sub-block arrangement, a multiplexer for generating sub-block groups by combining a plural channel group of sub-blocks with the added sub-block identification flags, and multiplexing the sub-block groups to the digital audio interface format. The data expander portion has a data block synthesizer for assembling data blocks from the sub-block groups input from the digital input circuit based on the sub-block identification flags, a demultiplexer for demultiplexing the assembled data blocks to each channel, and a data expansion circuit for expanding the data blocks to extract the original digital audio data.

18 Claims, 34 Drawing Sheets

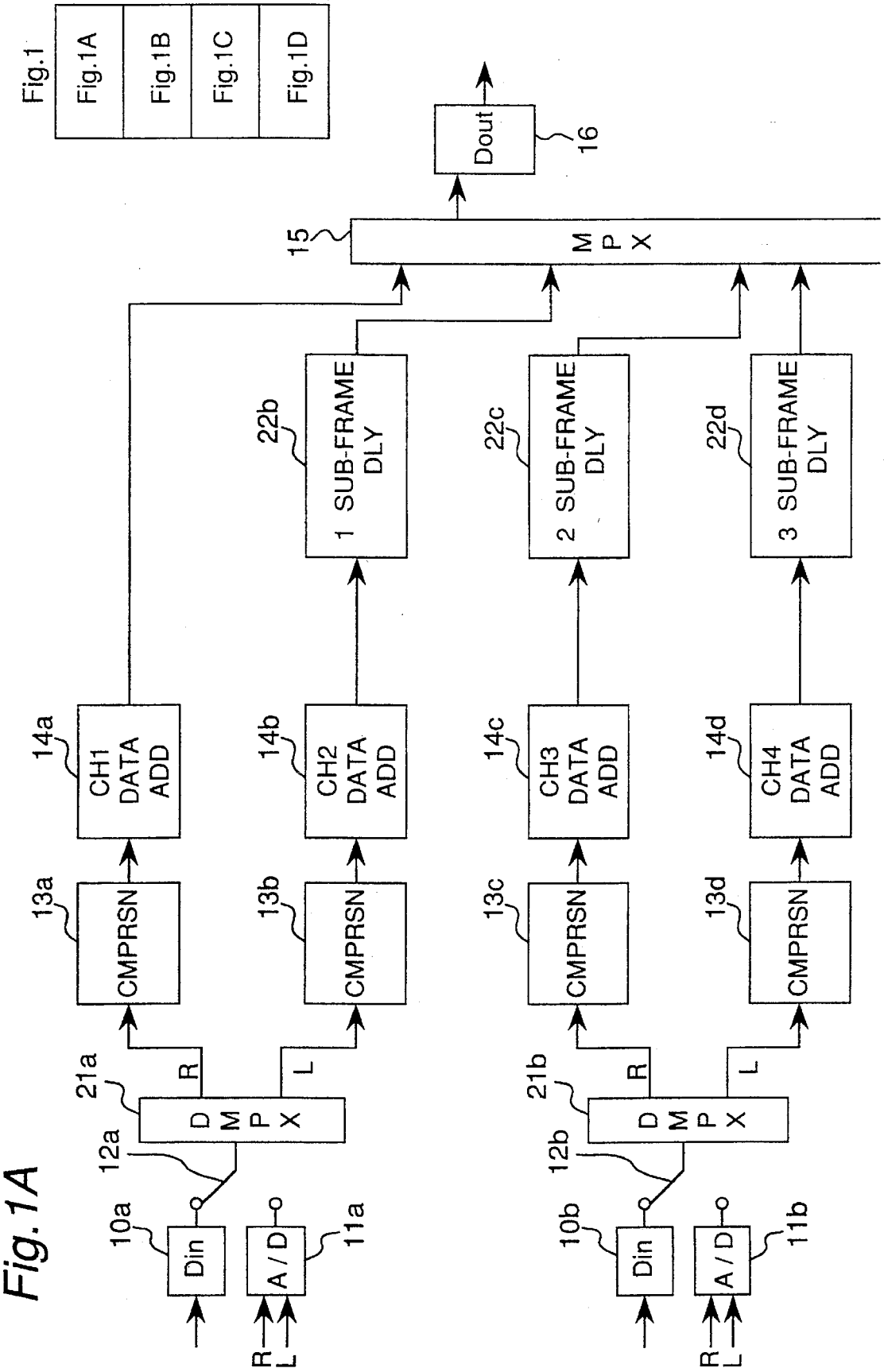

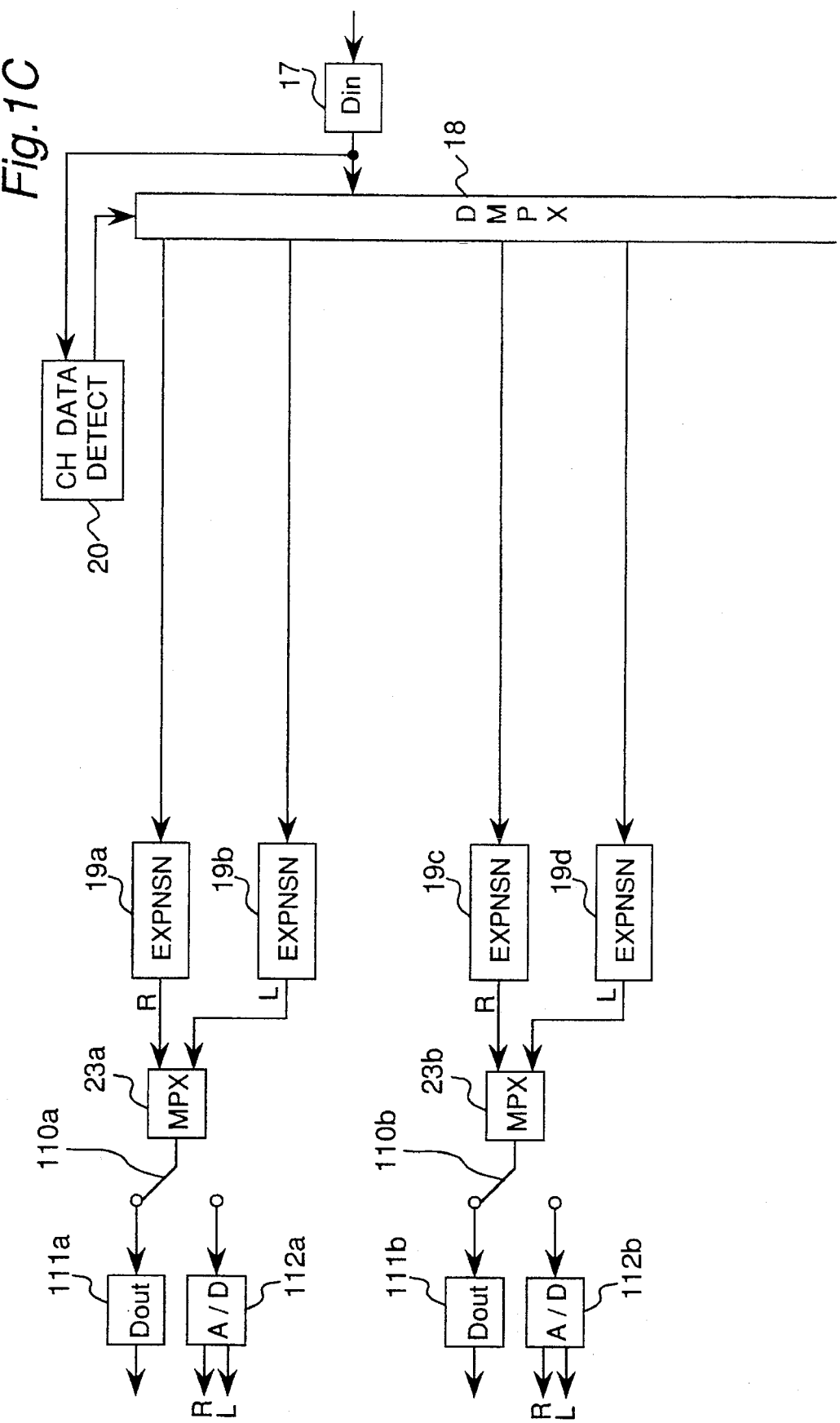

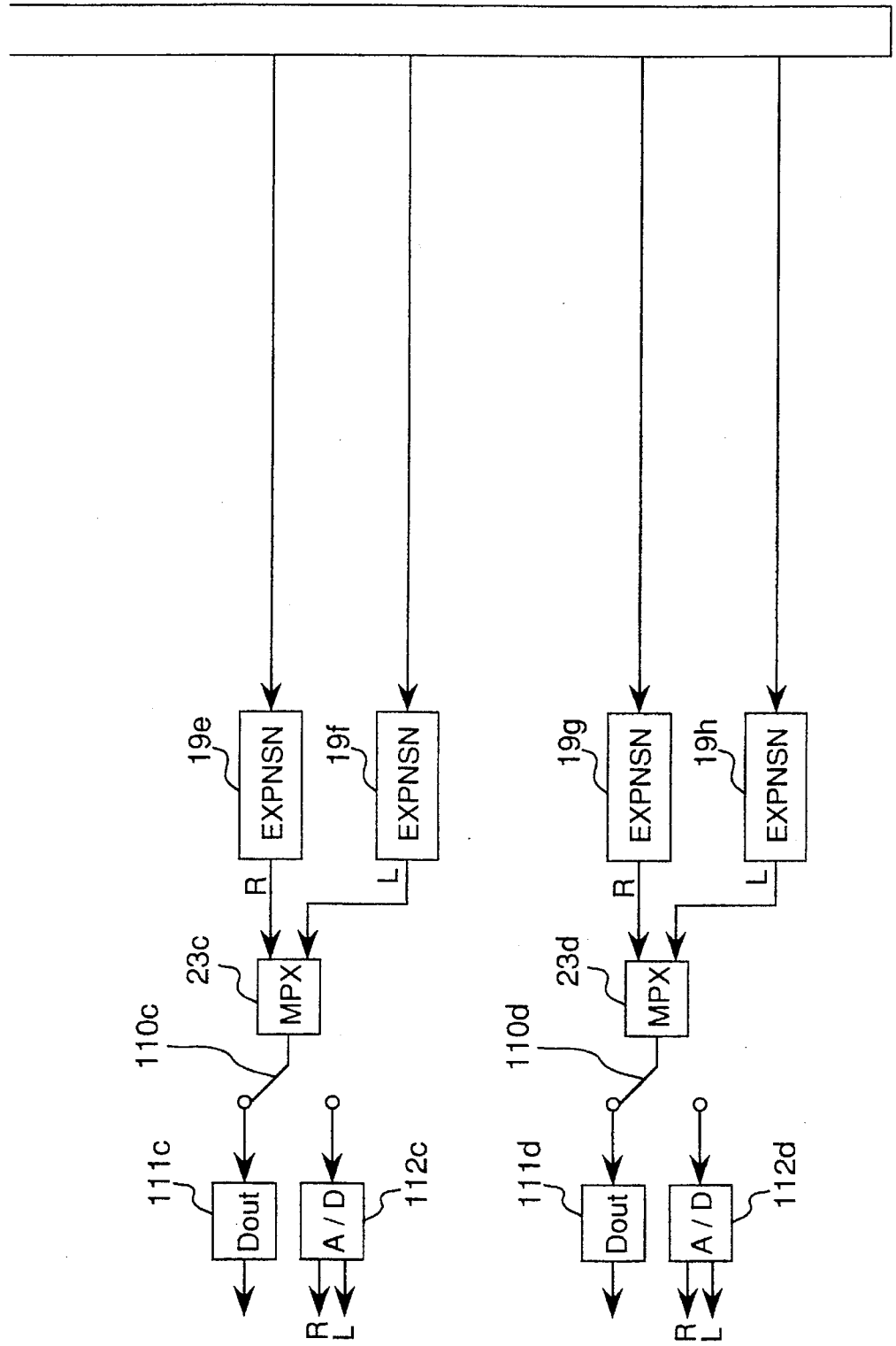

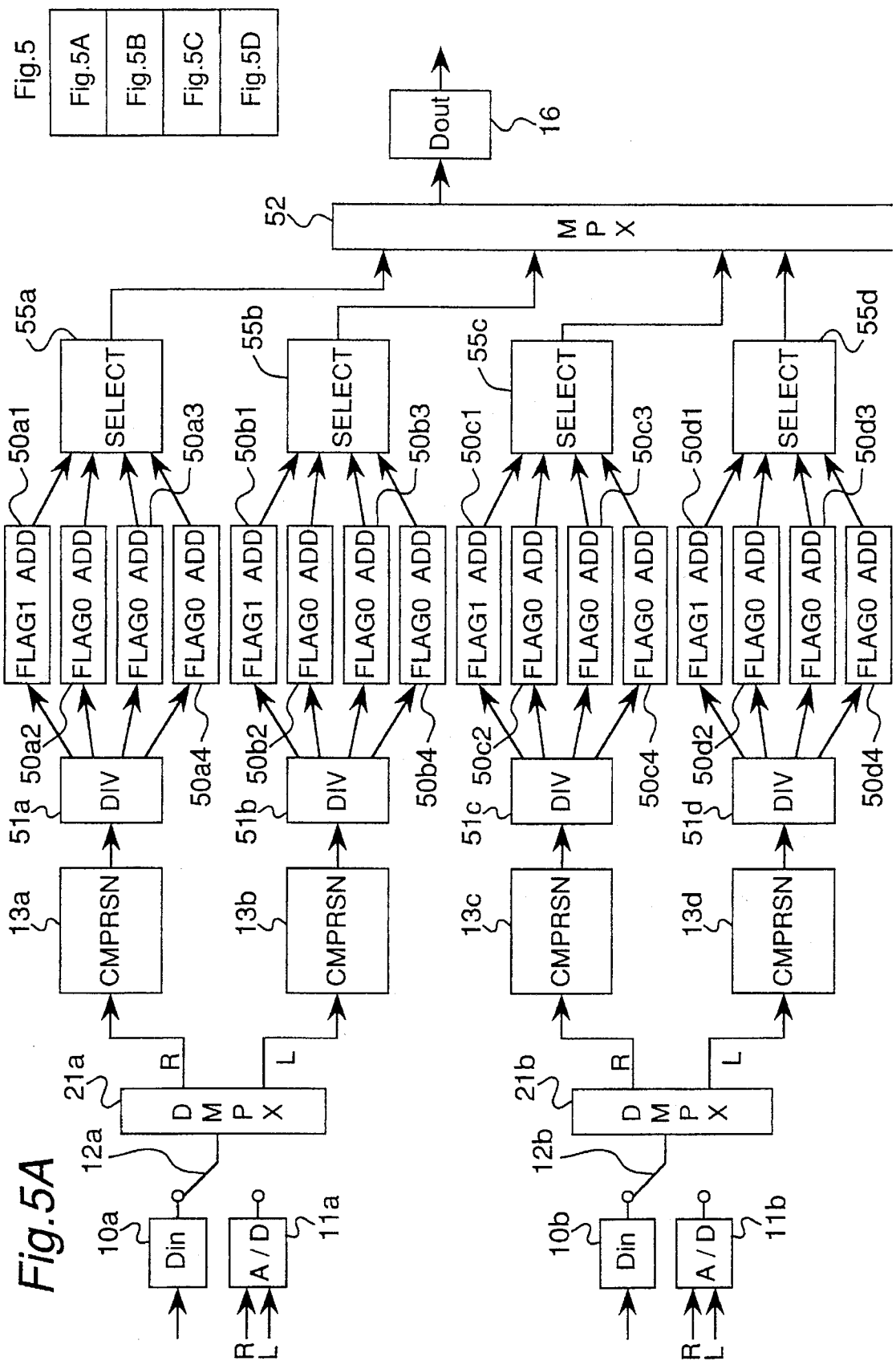

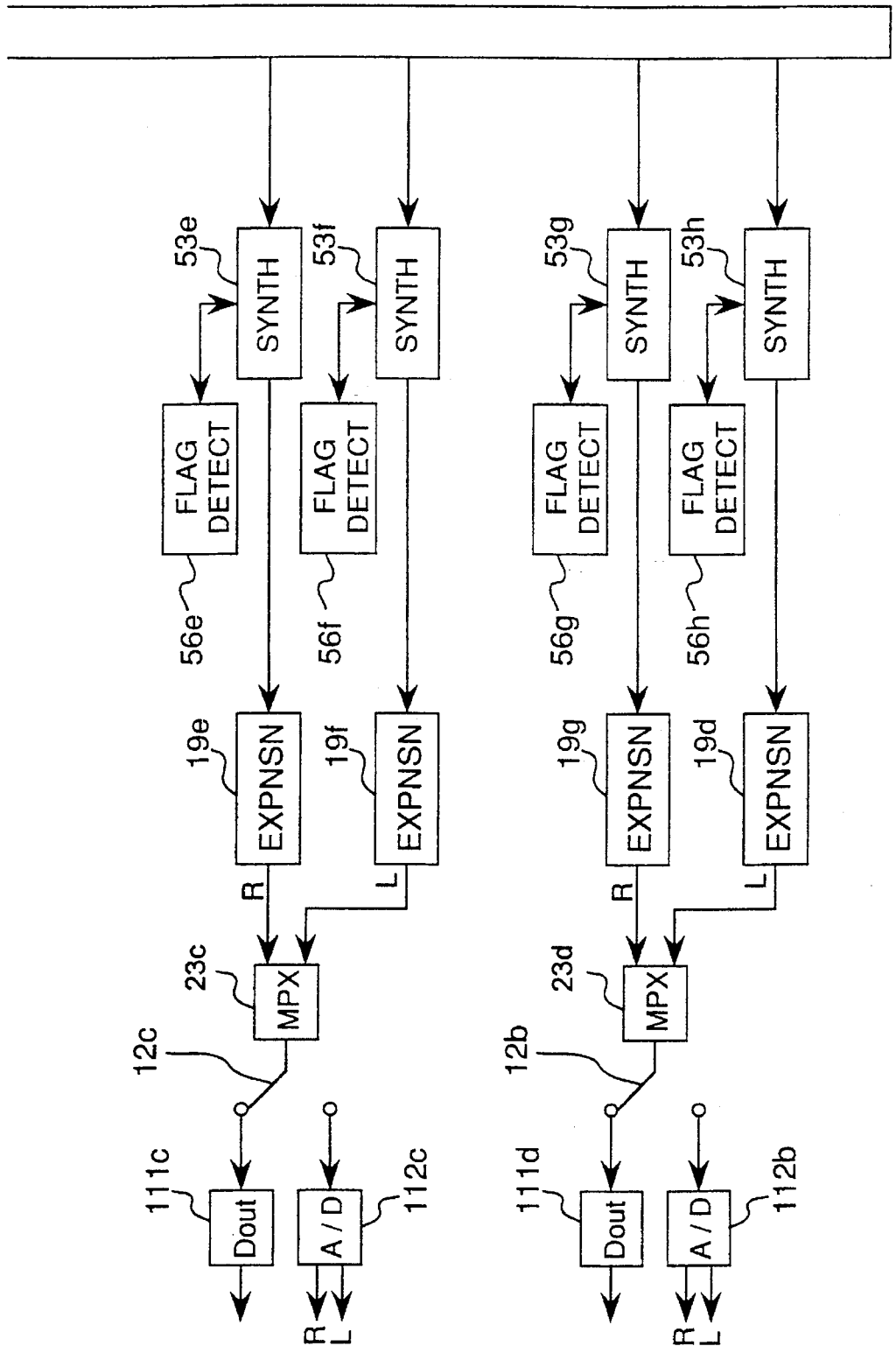

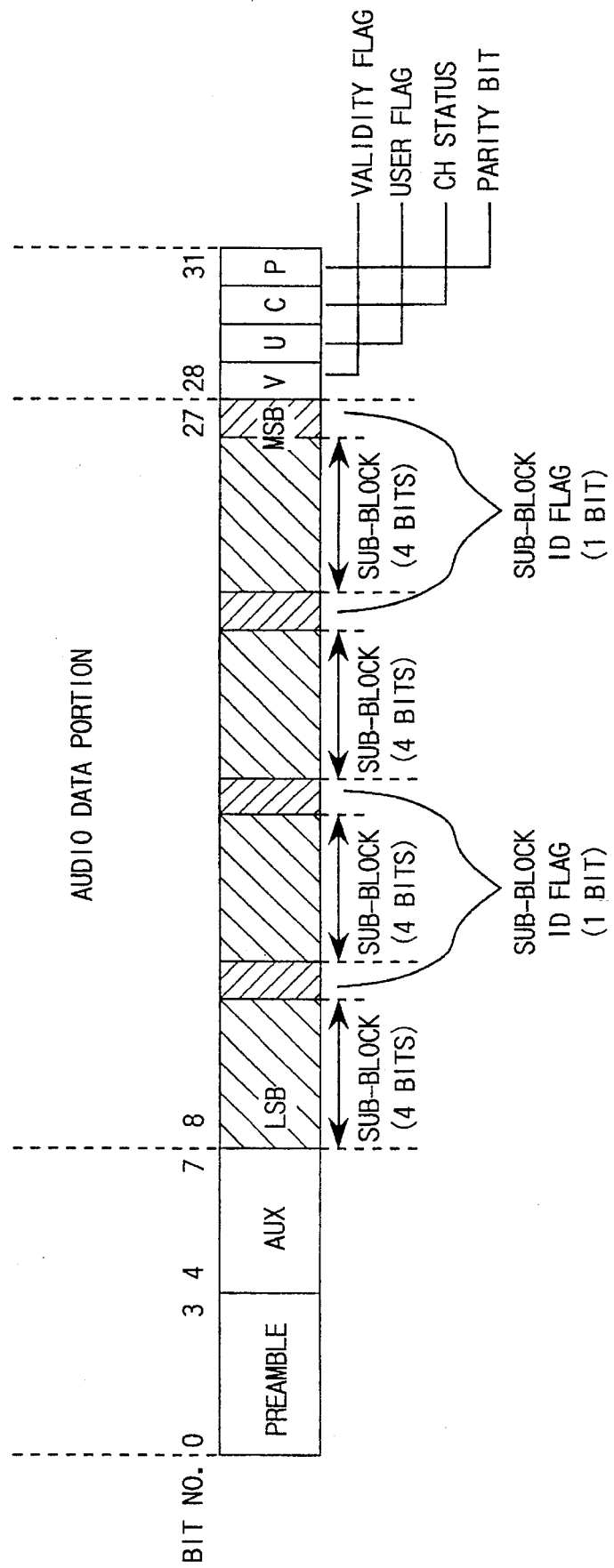

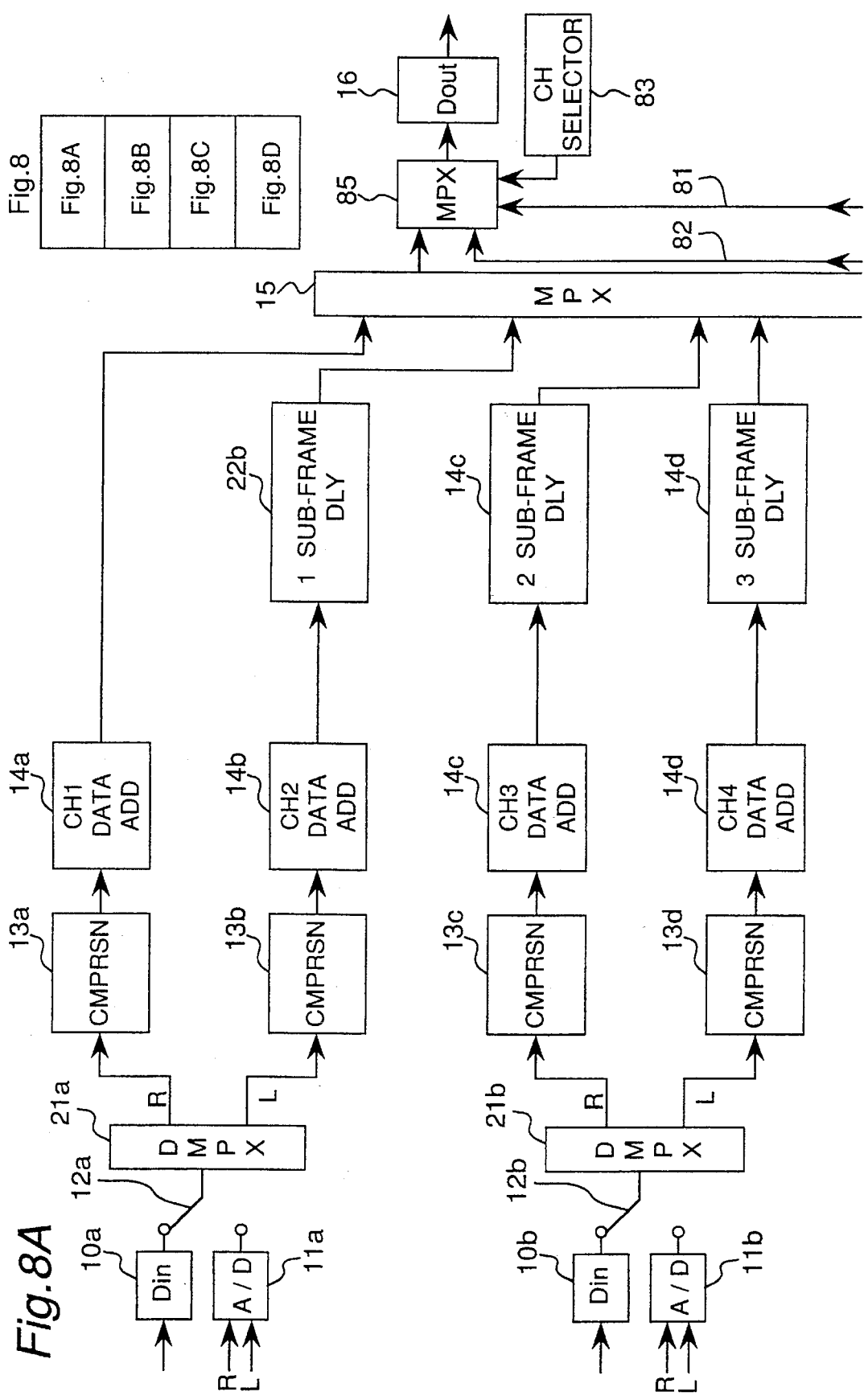

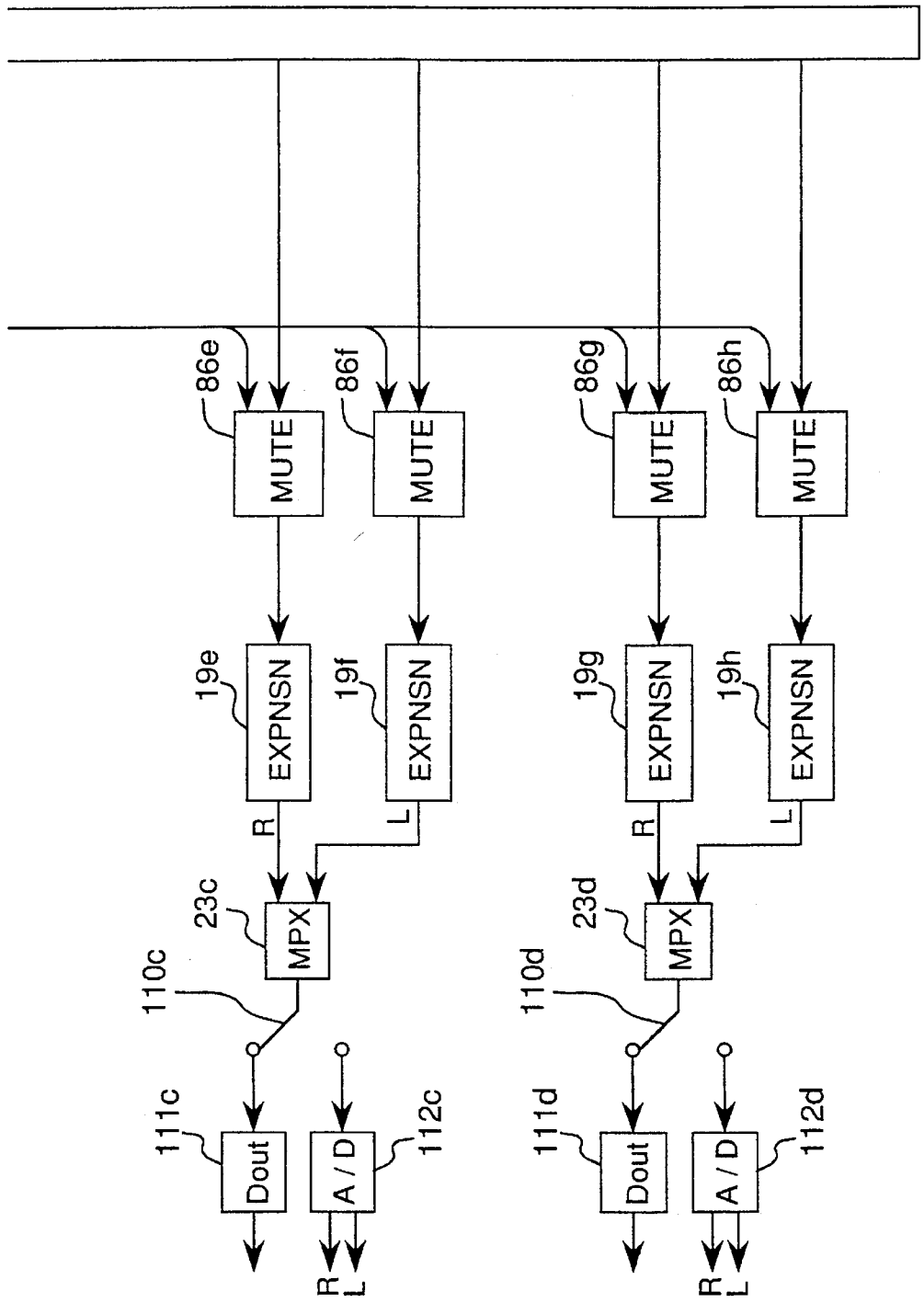

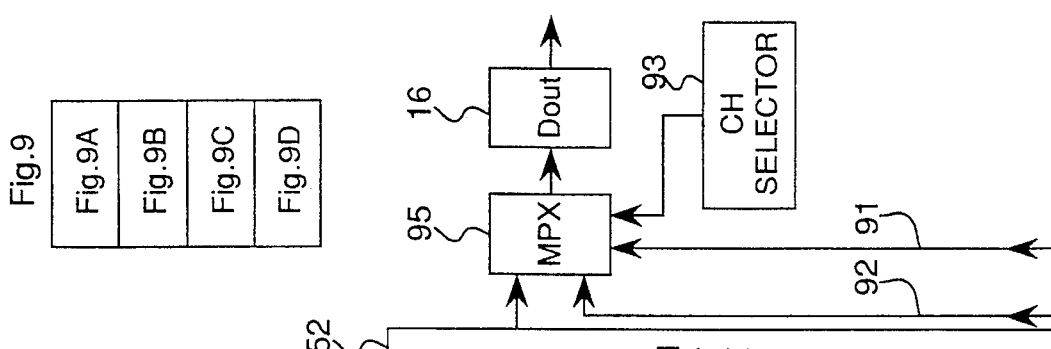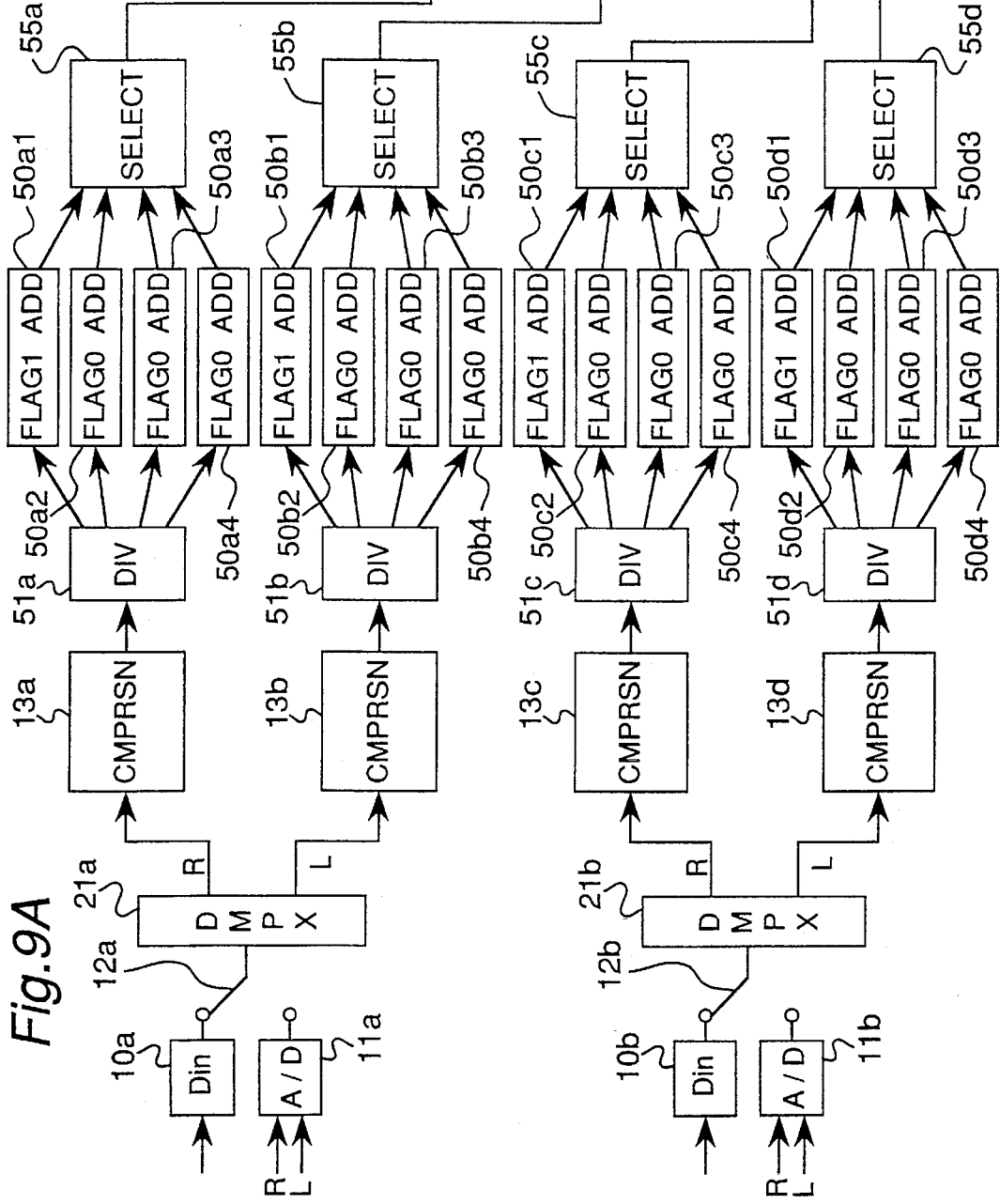

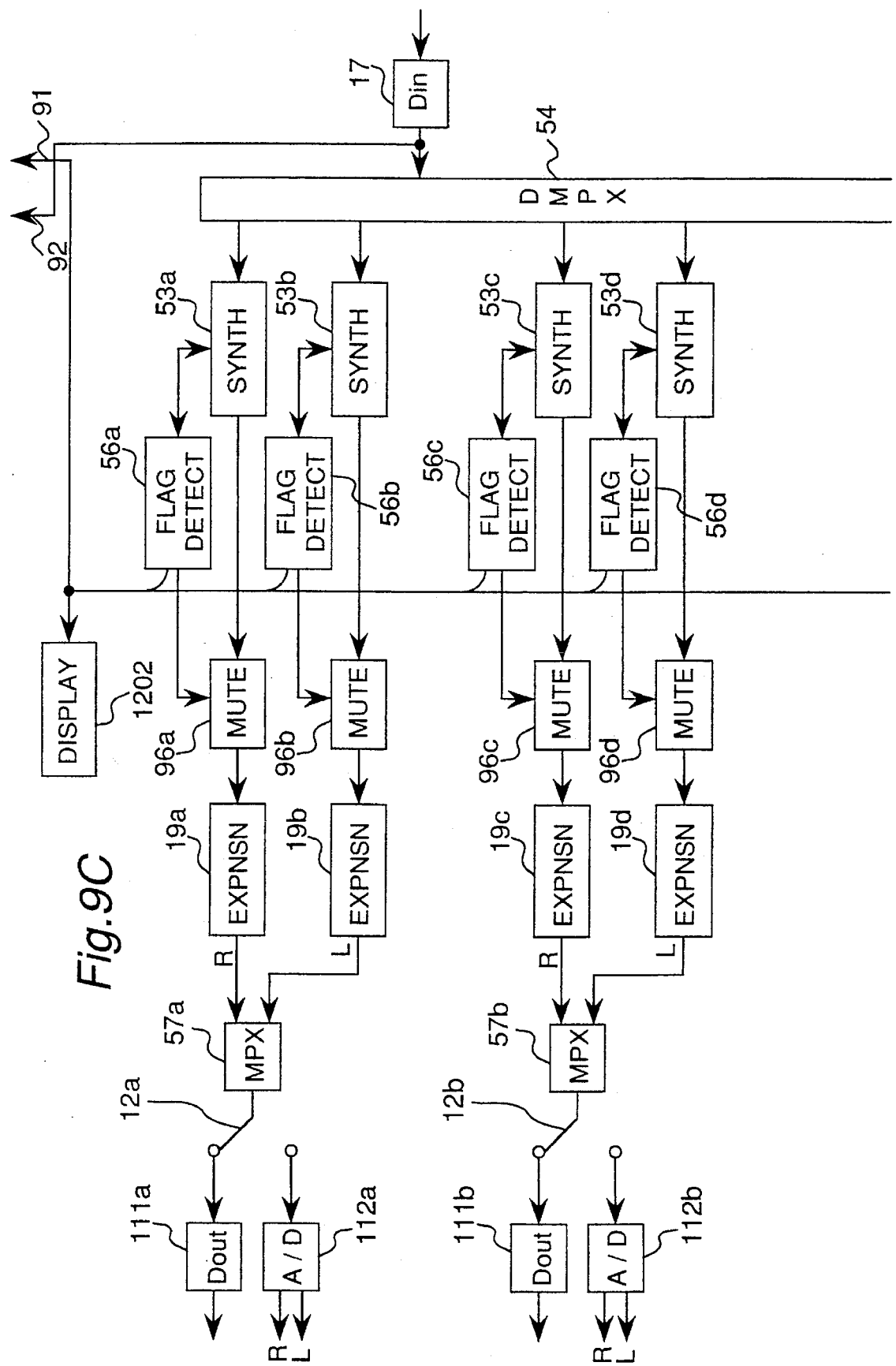

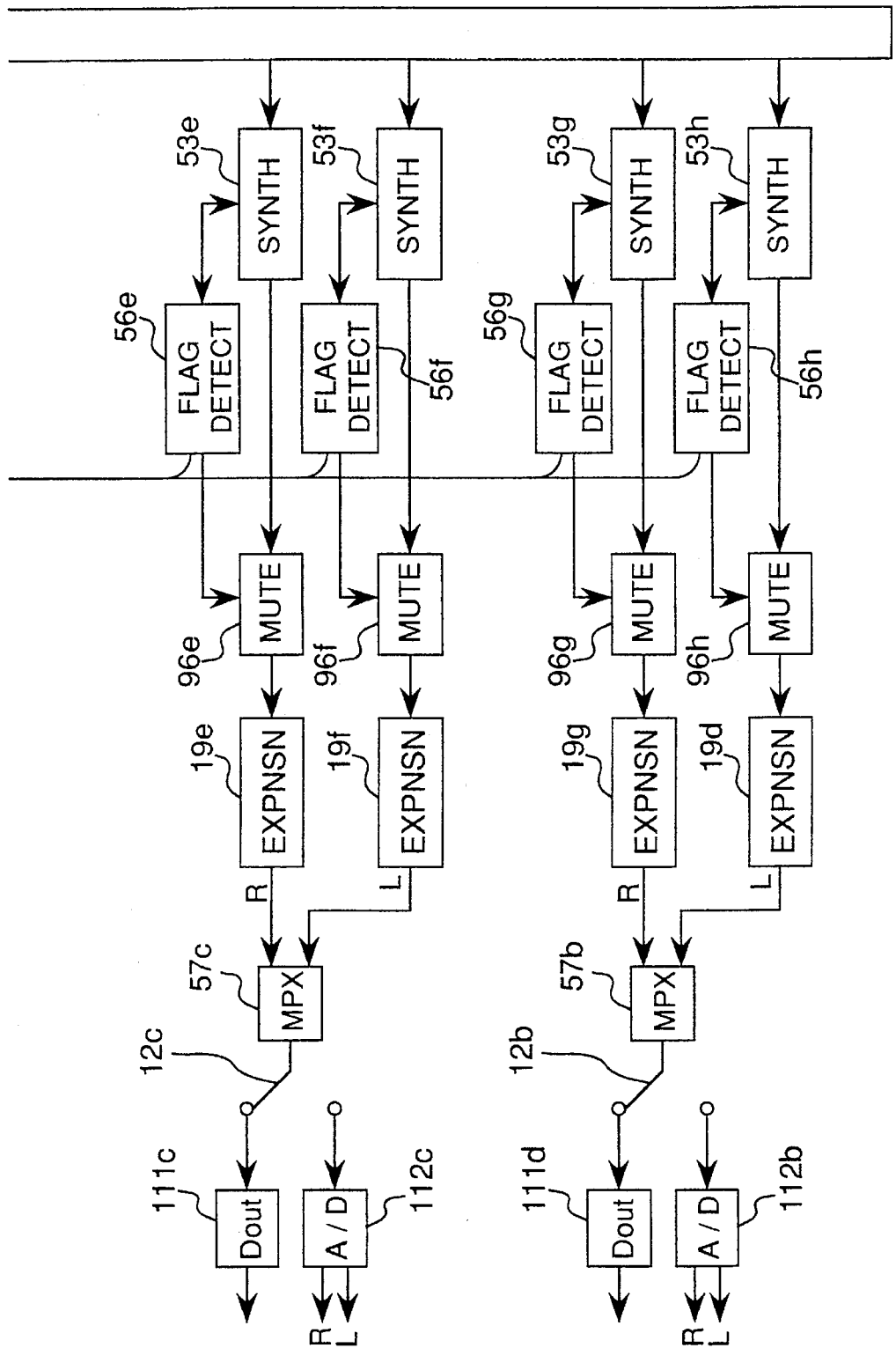

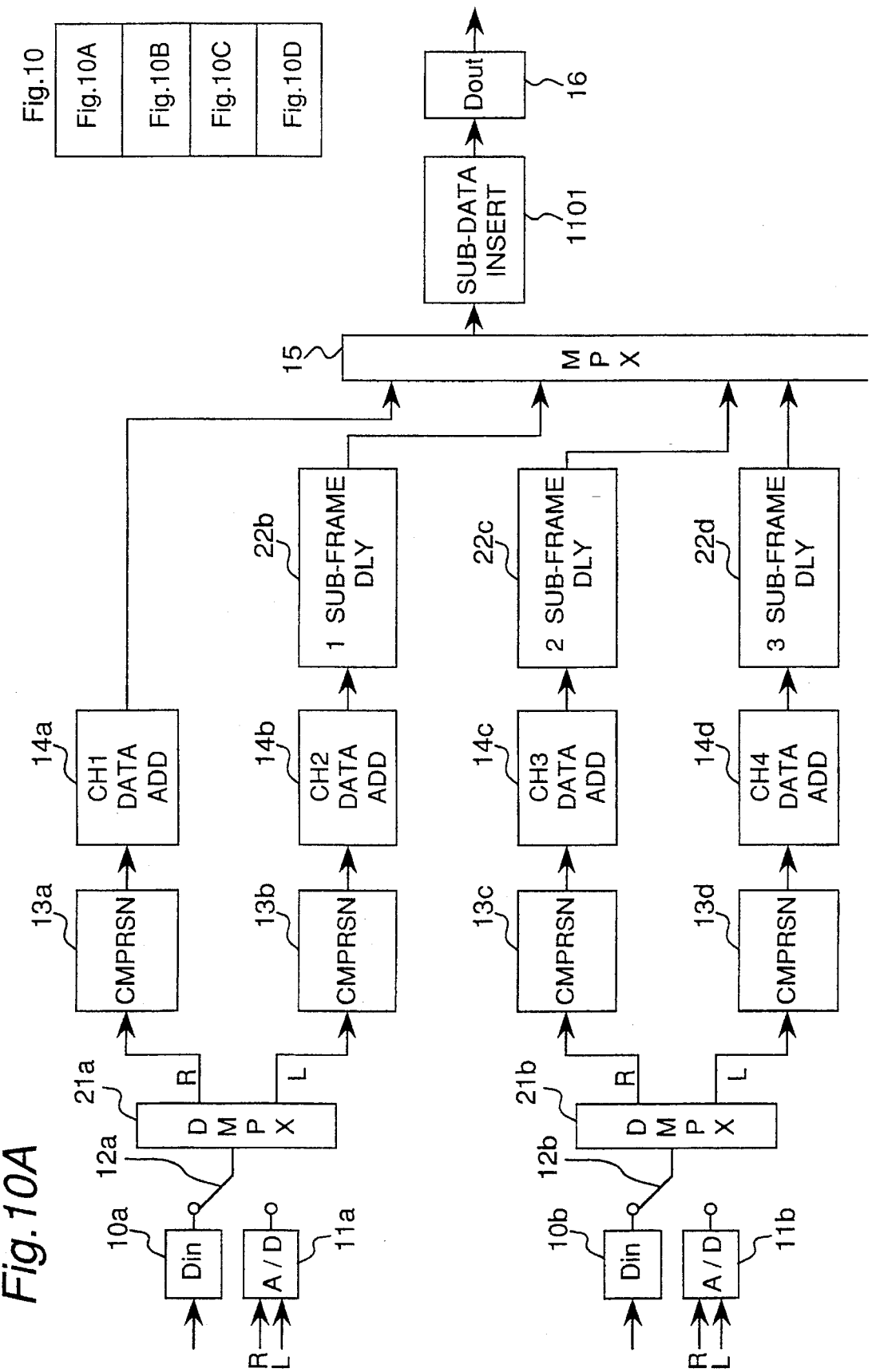

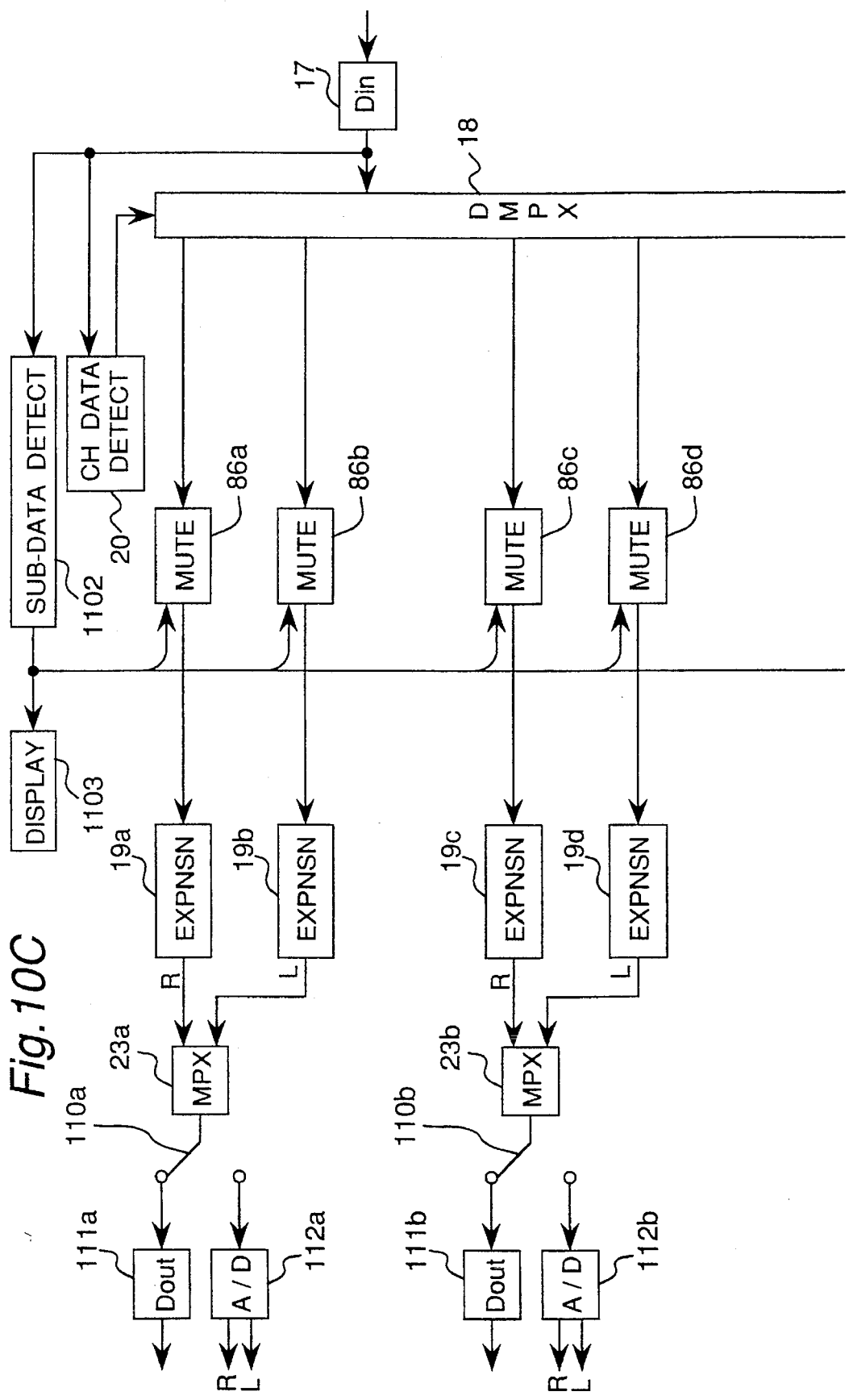

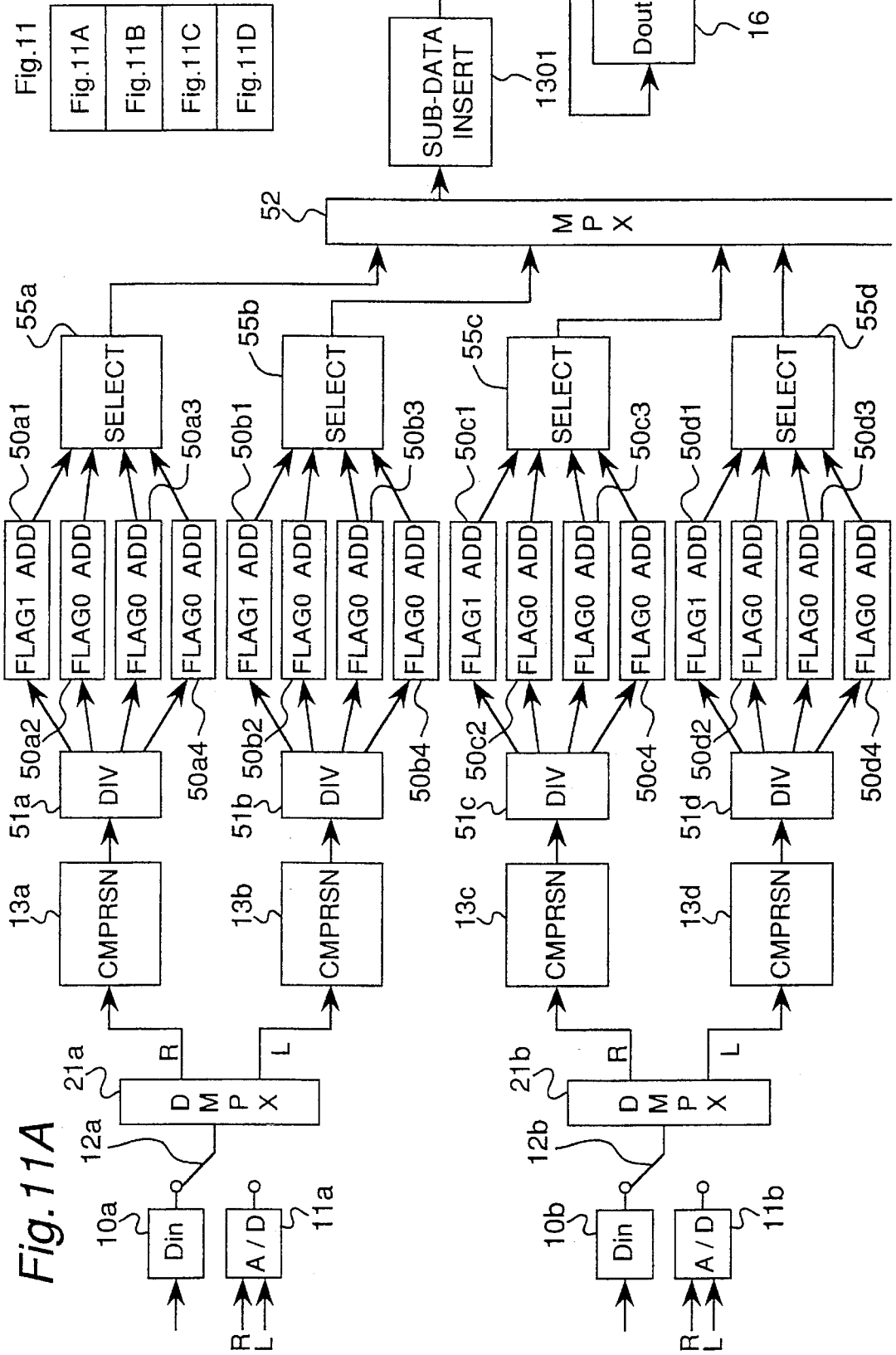

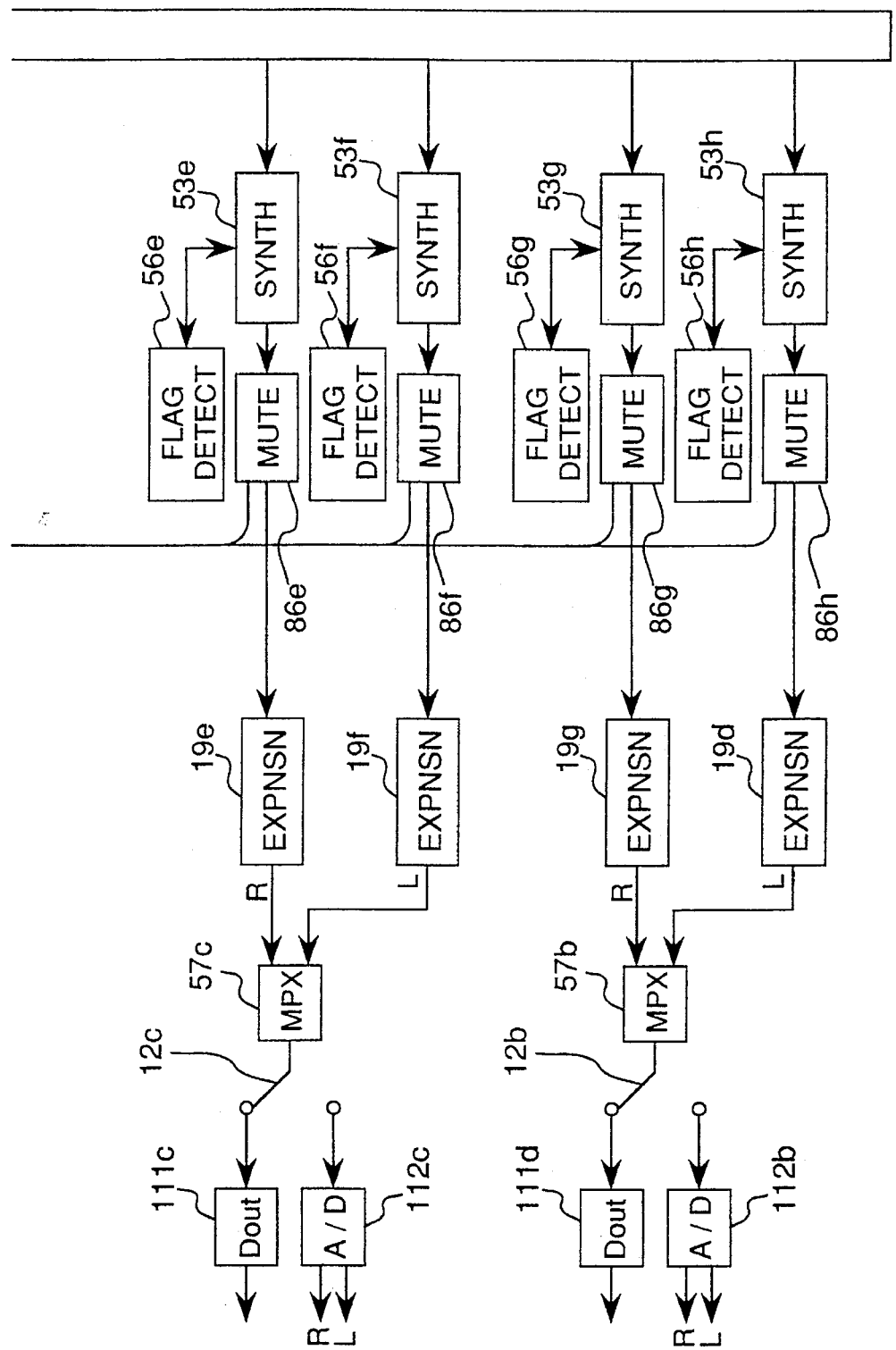

MULTIPLE CHANNEL MULTIPLEXING APPARATUS

BACKGROUND OF THE INVENTION

1. Field of the Invention

The present invention relates to a multiple channel multiplexing apparatus for multiplexing multiple channels of digital audio data in a digital audio interface by applying data compression and expansion technologies.

2. Description of the Prior Art

Increasing the number of audio channels is one trend in modern audio equipment. For example, with the spread of satellite broadcasting in Europe, a single broadcast can cover numerous countries, and demand for multilingual broadcasts has increased as broadcasting areas have expanded. This has strengthened demand for plural audio channel capabilities in commercial video and audio equipment in particular. While two audio channels has been the mainstream in conventional video equipment, four channels are becoming increasingly common, and as market demand grows in the coming years, demand is expected to grow for even more audio channels.

A parallel trend in recent audio equipment is digitization, the most common example of which is the widespread acceptance of the compact disc (CD) format and replacement of LP record libraries with CDs.

Both linear and non-linear quantization are currently used for quantizing analog audio signals. Linear quantization with 16 quantization bits and a sampling frequency of 44.1 kHz is used in the CD format. The digital audio nape (DAT) format uses linear quantization with 16 quantization bits and a sampling frequency of 48 kHz. Products compatible with 20-bit linear quantization are beginning to appear.

A more recent trend in digital audio is the use of digital audio data compression technologies applying digital signal processing technologies. Compression technologies that efficiently compress data by actively using the hearing characteristics of humans to remove unnecessary information, i.e., remove signal components beyond the range of human hearing, have begun to appear in such consumer audio equipment as Digital Compact Cassettes (DCC$^{(R)}$) and Mini Disks (MD$^{(R)}$). Using the compression/expansion technologies applied in DCC$^{(R)}$ or MD$^{(R)}$, the audio transfer rate obtained with the common linear quantization methods used in CDs and bAT can be compressed to ¼–⅕, and the signal can be expanded during reproduction with virtually no deterioration of audio quality.

For example, while the transfer rate of a two channel audio signal quantized at a sampling frequency of 48 kHz and 16 bits/sample is 48 k×16 bits×2 channels=1.536 Mbps, ¼ compression obtains a transfer rate of only 384 Kbps. This is equivalent to the transfer rate of a 4-bit two channel audio signal at a 48-kHz sampling frequency.

Using the digitization technologies and digital audio data compression technologies of modern audio equipment as described above, increasing the number of audio channels should be both possible and practical. One possibility is to use these compression technologies to multiplex a greater number of compressed channels in a digital audio interface used for transferring digital audio data between digital devices. If each channel is quantized at 16 bits and compressed ¼, and four channels of data are multiplexed together, it is possible to easily increase the number of channels with virtually no change in the transfer format. If this digital audio interface is then connected to a digital recording/reproducing apparatus, all digital recording/reproducing devices with a digital audio interface can be used for plural channel recording and reproducing.

An example of a multiple channel multiplexing apparatus for multiplexing plural channels of compressed digital audio data to a digital audio interface of this type is described below. The digital audio interface multiplexing plural channels in the following example is the digital audio interface defined in Electronic Industries Association of Japan (EIAJ) standard CP-340 (hereafter the AES/EBU digital audio interface), the entire content of which is expressly incorporated by reference herein.

The AES/EBU digital audio interface is described first below.

FIG. 12 is a typical drawing of the signal format of the AES/EBU digital audio interface. Except for part of the channel status information, this signal format is the same for consumer and commercial equipment, and all equipment types and transfer formats. The basic unit is a frame (1 subframe×2 channels) with the same repeating frequency as the sampling frequency of the transferred digital audio data, and 192 frames are grouped in one block. Each frame is divided into two subframes containing the data for channels 1 and 2, respectively. Each subframe comprises 32 bits, of which 20 bits are audio data and 4 bits are reserved (AUX) for future bit expansion.

The first 4 bits at the beginning of the subframe are the preamble containing a synchronization signal for indexing and a subframe identification signal. In FIG. 12, B, M, and W indicate the preamble, while M further indicates the first subframe in the frame, W indicates the second subframe in the frame, and B indicates the beginning of the block. The last 4 bits in the subframe are subdata, V being the validity flag indicating whether the transferred data is correct, U being user data, C being the channel status, and P being the parity flag. This channel status forms one word in one block (192 bits), and carries such system information as whether emphasis is applied, the sampling frequency, and whether the transferred data is linearly quantized digital audio data. Part of the channel status information differs in consumer and commercial applications.

It is thus possible co transfer two channels of digital audio data on one line of the AES/EBU digital audio interface. Because the audio data component of each channel is 20 bits, this transfer rate can transfer a maximum 20 bits of data per channel. Therefore, if compression technologies are used and the effective transfer rate after compression is 4 bits, it is possible to multiplex a maximum five channels of data to the audio data component of one channel. If the AUX bits are also used, a maximum of six channels can be multiplexed.

FIG. 13 shows the format of the signal multiplexed to the AES/EBU digital audio interface described above. In this example, four channels of data compressed to 4 bits (shown as channel numbers (1)–(4) in the figure) are muitiplexed to one subframe. Because there are two subframes per frame, a total of 8 channels are multiplexed to one frame.

FIG. 14 shows how the channels are arranged when eight channels are multiplexed to one frame using the multiplexing method shown in FIG. 13. Only the audio data component of each subframe is shown in FIG. 14; the numbers in the blocks indicate the channel number for easier understanding. As shows in FIGS. 13 and 14, all channels are multiplexed to fit in one frame. Because all channels are fit into one frame with this method, there is no difference in the arrangement of data in different frames. Signal processing is therefore simpler than when plural channels are multiplexed across plural frames.

It should be noted, however, that this method is effective when one sample of the 16 (e.g.) quantization bits can be sequentially compressed to the corresponding four bits, i.e., in a compression method in which one sample which is independent of the samples before and after that one sample is also independent after compression. In practice, however, many LSI devices used for compression do not operate in this way. The compressed data is coded data containing coefficients and other information, and four bits do not necessarily represent one sample. As a result, this compressed data does not represent samples of digital audio data. In general, the data compressed in this process is sequentially output from the compression LSI device as single blocks of meaningful data. This output unit is the "data block." In many cases the size of the data block is 16 bits. These data blocks are described in greater detail below.

FIG. 15 is used to describe the data block concept below, and shows the relationship between the linearly quantized input data and the data block output from the compression LSI device. During compression, 16-bit linearly quantized digital audio data is sequentially input to the compression LSI device. While the compression LSI device executes various operations and outputs the operation result, the input/output timing controls operation such that rather than outputting 4 bits for each 16-bit input, 16 bits of compressed data (one data block) containing the compressed data for four samples is output each time four samples of 16-bit linearly quantized data are input. As a result, the time length of the 16-bit data block is four times the time length of the 16-bit linearly quantized data input. This 16-bit data block has meaning only as a single data block, i.e., retains the same least-significant-bit (LSB), most-significant-bit (MSB) concept. The input and output signal flow shown in FIG. 15 is reversed during data expansion, and the data input to the expansion LSI device must be in data block units.

This data block concept is normally used for data compression and expansion.

The problem with this concept is that when a data compression/expansion method having this data block concept in the compressed data is used in a conventional multiple channel multiplexing apparatus as described above, the data block unit is destroyed during the multiplexing operation, and channel multiplexing and demultiplexing cannot be correctly executed.

SUMMARY OF THE INVENTION

Therefore, an object of the present invention is to provide a multiple channel multiplexing apparatus capable of multiplexing and demultiplexing multiple channels in a data compression/expansion system retaining this data block concept.

To achieve this object, according to one preferred embodiment of the present invention, a multiple channel multiplexing apparatus for producing and receiving multiplexing plural channels of digital audio data in a digital audio interface format in which frames repeat at the same frequency as the sampling frequency of the digital audio data, said apparatus comprises: data compression means for compressing M samples of digital audio data (wherein M is an integer greater than or equal to 2) to 1/N data (wherein N is an integer greater than or equal to 2) to form a data block; channel data adding means for adding to said data block a channel data identifying a particular channel to which said data block is associated; multiplexing means for multiplexing plurality of said data block to form a continuous M frames in the digital audio interface format; demultiplexing means for demultiplexing the received data block of plural channels to each channel based on the channel data added to the data block; and data expansion means for data expanding the demultiplexed data block N-times to obtain M samples of digital audio data.

According to another preferred embodiment of the present invention, a multiple channel multiplexing apparatus for producing multiplexing plural channels of digital audio data in a digital audio interface format in which frames repeat at the same frequency as the sampling frequency of the digital audio data, said apparatus comprises: data compression means for compressing M samples of digital audio data (wherein M is an integer greater than or equal to 2) to 1/N data (wherein N is an integer greater than or equal to 2) to form a data block; dividing means for dividing a block of said data block into L sub-blocks (where L is an integer greater than or equal to 2 and less than or equal to M); sub-block identification flag adding means for adding to each of said L sub-blocks a sub-block identification flag identifying at least a leading sub-block in said L sub-blocks; multiplexing means for multiplexing said sub-blocks, the number of which is equal to M times L, in a predetermined channel sequence in M frames, so that a specific position in M frames is allocated to a sub-block of a specific channel; data block synthesizing means for assembling the received L sub-blocks delivered to different channels in said predetermined channel sequence based on the sub-block identification flags added to said sub-blocks to form said data block for each channel; and data expansion means for data expanding said data block in each channel N-times to obtain M samples of digital audio data.

The present application is based upon Japanese patent applications Ser. Nos. 4-330,182, and 6-101,086 which were filed on Dec. 10, 1992 and May 16, 1994, respectively, the entire content of which is expressly incorporated by reference herein.

BRIEF DESCRIPTION OF THE DRAWINGS

The present invention will become more fully understood from the detailed description given below and the accompanying diagrams wherein:

FIGS. 1A, 1B, 1C and 1D taken together as shown in FIG. 1 show a block diagram of a multiple channel multiplexing apparatus according to the first embodiment of the invention, FIG. 6 shows the typical signal format multiplexed to the AES/EBU digital audio interface by the apparatus of the second embodiment.

DESCRIPTION OF PREFERRED EMBODIMENTS

Referring to FIGS. 1A–1D, a block diagram of a multiple channel multiplexing apparatus according to the first embodiment of the invention is shown. FIG. 1 shows the relationship between FIGS. 1A, 1B, 1C and 1D. This multiple channel multiplexing apparatus is capable of multiplexing eight channels of linearly quantized digital audio data compressed ¼ to an existing digital audio interface capable of transferring two channels of linearly quantized digital audio data in an uncompressed state.

Figure 1B:
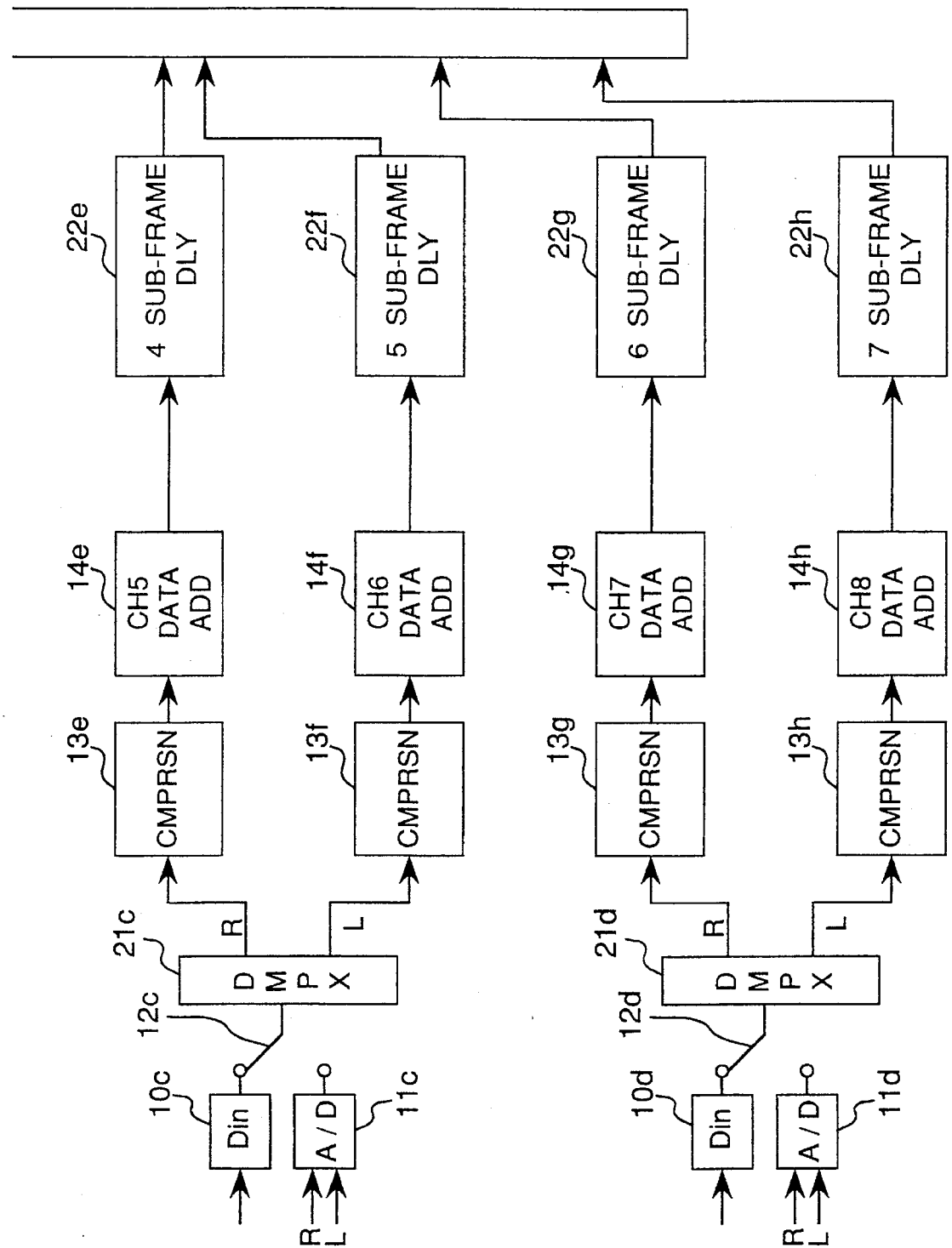

Note that the section shown in FIGS. 1A and 1B is referred to below as the data compressor portion, and the section shown in FIGS. 1C and 1D is referred to below as the data expander portion.

As shown in FIGS. 1A and 1B, the data compressor portion comprises four digital input circuits ($D_{in}$) 10a–10d to each of which receives audio signals and produces a mixed signal of two channel (usually right and left) digital audio data; four A/D converters 11a–11d for converting analog input to digital audio data; and four input selector switches 12a–12d for switching between $D_{in}$ 10a–10d and A/D converter 11a–11d. Switch 12a–12d is turned to $D_{in}$ 10a–10d when the data source presents the digital signal, but is turned to A/D converter 11a–11d when the data source presents the analog signal. Four demultiplexers 21a–21d are provided for separating the input left and right audio signals. Eight data compression circuits 13a–13h are provided, two for each demultiplexer, for data compression of the right and left digital audio signal separately. circuit 13 is formed, for example, by an LSI chip Model No. APTX100ED manufactured by APT of England, and employs the sub-band AD-PCM conversion method.

The data compressor portion further comprises eight channel data adders 14a–14h for adding a channel identification data, such as CH2, to each of the channels of the outputs of the data compression circuits 13a–13h, respectively. Seven delays 22b–22h are inserted to the seven paths from the data compression circuits 13b–13h, respectively, for delaying one sub-frame period, two sub-frame period, three sub-frame period, four sub-frame period, five sub-frame period, six sub-frame period, seven sub-frame period, respectively. A multiplexer 15 is provided for receiving the CH1 audio data directly from the channel data adder 14a, and CH2–CH8 audio data from delays 22b–22h, respectively. The multiplexer 15 multiplexes the data blocks to which the channel data have been added. A digital output circuit ($D_{out}$) 16 is provided which inserts necessary data, such as preamble and various flags V, U, C and P to the output of the multiplexer 15 from the data compressor portion, and sends out the data to a storing device, such as a VCR.

Referring particularly to FIGS. 1C and 1D, the data expander portion comprises a digital input circuit ($D_{in}$) 17 for inputting data to the data expander portion; a demultiplexer 18 for demultiplexing the data blocks input from the $D_{in}$ 17 to the separate channel components as detected by channel data detector 20; eight data expansion circuits 19a–19h for expanding the data blocks demultiplexed by the demultiplexer 18 to obtain the digital audio data; multiplexers 23a–23d for multiplexing right and left digital audio signals to a single digital audio signal; and four output selector switches 110a–110d for switching the outputs of the multiplexer 23a–23d to the corresponding digital output circuit ($D_{out}$) 111a–111d or D/A converter 112a–112d.

The compression/expansion technologies deployed by the data compression circuits 13a–13h and data expansion circuits 19a–19h use the MPEG audio compression coding method, i.e., a method using the characteristics of human hearing to remove unnecessary information, and are capable of compressing the data transfer rate of a 16-bit linear quantization rate to a 4-bit equivalent transfer rate (¼). In addition, while the data compression circuits 13a–13h and data expansion circuits 19a–19h of this embodiment are described as being able to compress/expand one channel of data, circuits for compressing/expanding two channels of data (left and right data) by one processing chip can be alternatively used. Also, it is possible to insert 7, 6, 5, 4, 3, 2 and 1 sub-frame delays before the inputs of seven data expansion circuits 19a, 19b, 19c, 19d, 19e, 19f and 19g, respectively.

Furthermore, the digital audio interface defined in Electrical Industry Association of Japan (EIAJ) standard CP-340 (hereafter the AES/EBU digital audio interface) is used.

Figure 2:
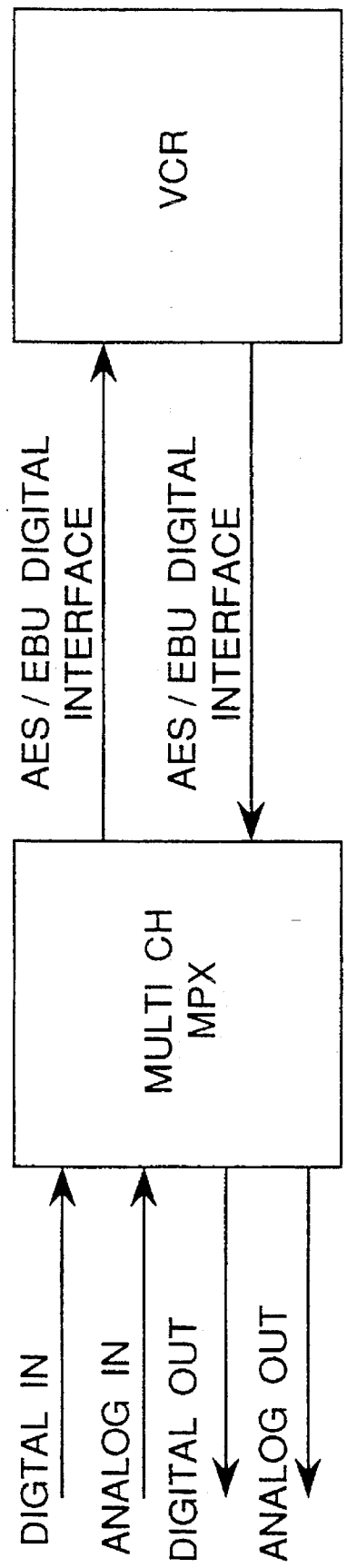
FIG. 2 is a diagram showing the connection of a multiple channel multiplexing apparatus according to the invention to a video device.

FIG. 2 illustrates how the multiple channel multiplexing apparatus of the present invention can be connected to a video device VCR having a digital audio interface and capable of digitally recording audio signals. The digital output of the data compressor portion of the multiple channel multiplexing apparatus is connected to the digital audio input of the video device, and the digital audio output of the video device VCR is connected to the digital input of the data expander portion of the multiple channel multiplexing apparatus.

A multiple channel multiplexing apparatus thus comprised according to this embodiment operates as follows.

Referring to FIGS. 1A and 1B, in the case where the input data source is a digital data source, selector switches 12a–12d are turned to the position shown in FIGS. 1A and 1B. In this case, the 16-bit linearly quantized digital audio signals are input through the AES/EBU digital audio interface to the eight channel inputs of the $D_{in}$ 10a–10d on the data compressor portion. It is noted that each $D_{in}$, such as 10a, takes two channel (e.g., right and left) data. On the other hand, in the case where the input data source is an analog data source, selector switches 12a–12d are turned to the opposite position to the position shown in FIGS. 1A and 1B. In this case, eight analog audio signals are input to the A/D converters 11a–11d, in which two channel (e.g., right and left) analog audio signals are linearly quantized to 16-bit digital audio data. It is noted that at $D_{in}$ 10a–10d or at A/D converter 11a–11d, the preamble data, aux data, and various flags are removed, so that only the audio data portion (FIG. 12) is transmitted.

The four sampled signals are demultiplexed at four demultiplexers 21a–21d, respectively, to produce eight channel data, almost simultaneously. The eight channel data are compressed by eight data compression circuits 13a–13h and are output as a 16-bit data block for each channel. To identify the channel number of the data block of each channel a 3-bit channel ID data is added to each data block by the channel data adder 14a–14h. The eight data blocks from eight channel data adders 14a–14h are produced almost simultaneously. The first data block with a channel ID data CH1 is applied directly to the multiplexer 15. The second data block with a channel ID data CH2 is applied to a one sub-frame delay 22b, so than the second data block with data CH2 is delayed and applied to the multiplexer 15 immediately after the first data block with data CH1 passes through the multiplexer 15. In this manner, the eight data blocks parallelly produced from the eight channel data adder 14a–14h are serially input to multiplexer 15. Then, the data blocks are inserted to eight data sub-frames of the AES/EBU digital audio interface. This multiplexing and insertion method is described in detail with reference to FIGS. 3A, 3B and 4 below.

Figure 3A:
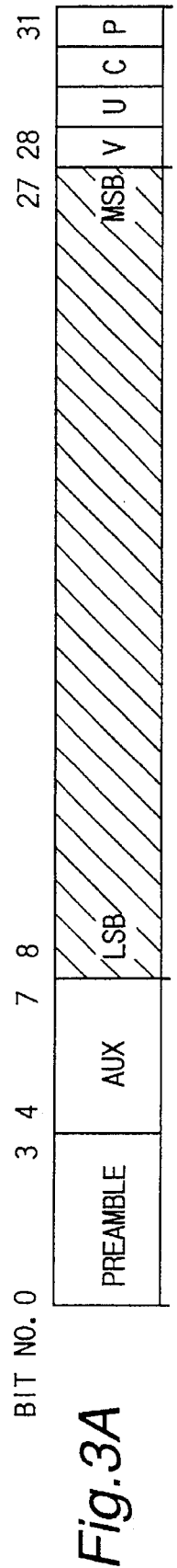
FIGS. 3A and 3B show diagrams of the typical signal format multiplexed to the AES/EBU digital audio interface by the apparatus of the first embodiment.
Figure 3B:
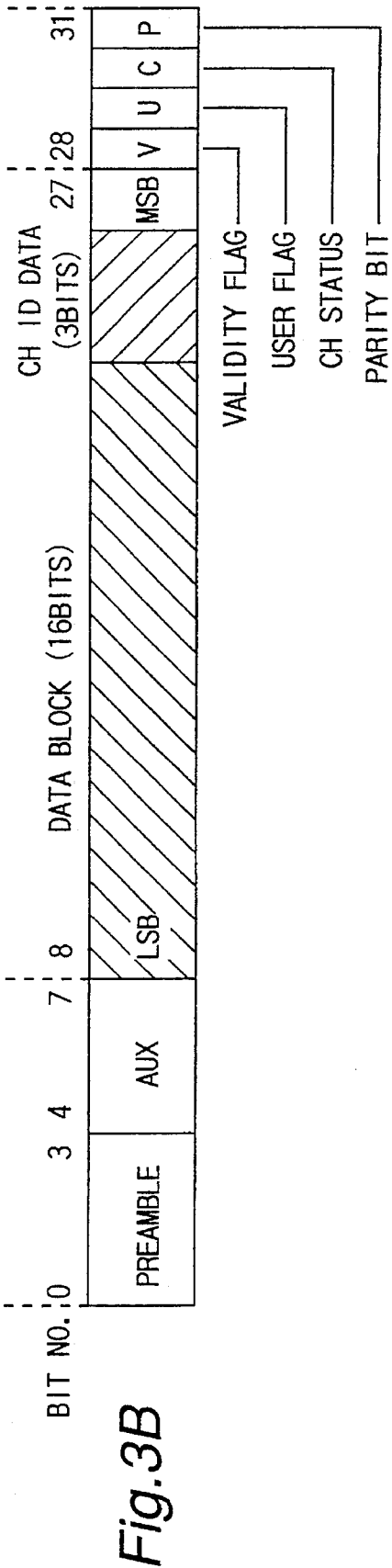

FIGS. 3A and 3B show the typical signal format in which the data block to which the channel ID data has been added by the channel data adder 14a–14h is multiplexed to the AES/EBU digital audio interface. FIG. 3A shows the single channel, 20-bit audio data placed in the sub-frame. FIG. 3B shows the compressed 16-bit data block placed with the channel ID data. The channel data identifies the channel numbers of the multiplexed data block, and uses three bits (capable of expressing eight values from 0–7) because eight channels are multiplexed. Note that while the channel data is positioned on the MSB side in FIG. 3B, it can be alternatively placed on the LSB side.

Figure 4:
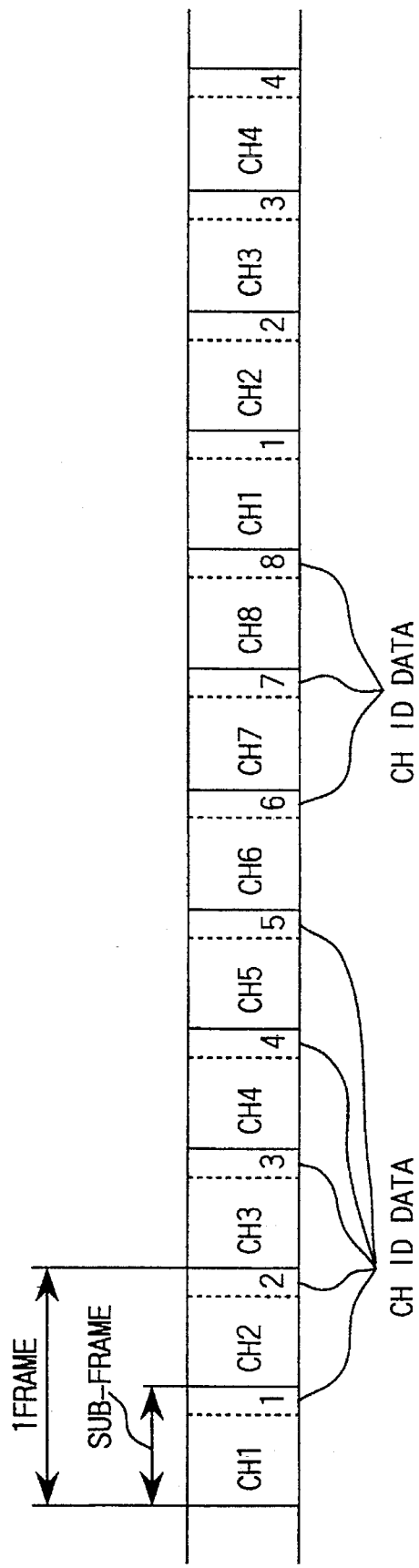
FIG. 4 shows the typical format of 8-channel multiplexing by the apparatus of the first embodiment, FIGS. 5A, 5B, 5C and 5D taken together as shown in FIG. 5 show a block diagram of a multiple channel multiplexing apparatus according to the second embodiment of the invention.

FIG. 4 shows the typical format of 8-channel multiplexing by the multiplexer 15 to the AES/EBU digital audio interface using the format shown in FIG. 3B. All signal components other than the audio data in the subframe have been omitted from FIG. 4. CH1–CH8 indicate the channel number of each data block, and the numbers 1–8 in the bottom right corners indicate the channel number of the corresponding channel data. The channel data makes it possible to determine to which channel each data block belongs, and channel number identification is not attempted using only the data block contents. As shown in FIG. 4, four frames of the AES/EBU digital audio interface are used in this embodiment to multiplex the data blocks by inserting the data for eight channels to eight data sub-frames.

The data multiplexed by the multiplexer 15 to the AES/EBU digital audio interface as shown in FIG. 4 is modulated by the $D_{out}$ 16 on the data compressor portion for external line output. When the multiple channel multiplexing apparatus is connected to a video device as shown in FIG. 2 or to a digital audio recorder, the multiplexed output signal can be recorded by the connected device. Note, however, that the connected recording device must be capable of recording/reproducing digital audio in a 20 bit (or greater) format.

Referring to FIGS. 1C and 1D, expansion is considered next. The compressed, multiplexed data is reproduced by, for example, the video device, and input from the AES/EBU digital audio interface to the $D_{in}$ 17 on the data expander portion. The input signal is passed to the demultiplexer 18, demultiplexed to the eight channel data blocks based on the channel data, and then input to the corresponding data expansion circuits 19a–19h in data block units for expansion. The expanded signals of two channels, such as for right and left signals, are multiplexed by multiplexers 23a–23d.

Depending on the position of the output selector switches 110a–110d, the expanded and multiplexed data is then digitally output by the $D_{out}$ 111a–111d of the data expander portion through the AES/EBU digital audio interface, or D/A converted by the D/A converters 112a–112d and analog output.

It is to be noted that three bits are used for the channel data in this embodiment, but a one bit channel identification method can also be used to mark the beginning of each sequence of channels 1–8 by setting the one bit every eight subframes.

Hereafter, the method described in the first embodiment above whereby channel data are added to plural channels of M linearly quantized digital audio data samples (where M is an integer of two or greater) data compressed 1/N (where N is an integer of two or greater), and this plural channel data is multiplexed to the audio data sub-frames of a continuous M frames is referred to as the "first multiplexing method." In the preferred embodiments, M=4 and N=4.

The multiple channel multiplexing method of a second embodiment of the invention using a multiplexing method different from the first multiplexing method is described next.

Referring to FIGS. 5A–5D, a block diagram of a multiple channel multiplexing apparatus according to the second embodiment of the invention is shown. FIG. 5 shows the relationship between FIGS. 5A, 5B, 5C, and 5D. Common elements in the first and second embodiments are identified by like reference numbers, and further description is omitted below.

The data compressor portion of this embodiment further comprises eight sub-block dividers 51a–51h for dividing one data block output by the data compression circuits 13a–13h into plural, such as four, sub-blocks. The description herein below is directed to a case when the data block is divided into four sub-blocks, and each sub-block having four bit data. Each divider, such as 51a, is connected to four sub-block ID flag adders 50a1–50a4 for adding to each of these sub-blocks a sub-block identification flag identifying the arrangement of the sub-blocks. Of the four sub-blocks, the first sub-block is added with a one-bit flag 1 by adder 50a1 so as to indicate that the first sub-block is the leading sub-block, and each of the remaining three sub-blocks are added with a one-bit flag 0 by adder 50a2, 50a3 or 50a4 so as to indicate that such sub-blocks are the followers. Thus, the sub-block is increased to five bit long after the flag adder. In the second embodiment, there are in total 32 flag adders are provided. The four flag adders, such as 50a1–50a4, are provided to each channel and are connected to a selector 55a for sequentially selecting one sub-block at a time, and the selected sub-block is applied to a multiplexer 52. Since there are eight channels, eight selectors 55a–55h are provided.

First, the selector 55a selects one sub-block, then the second selector 55b selects one sub-block, and then the third selector 55c selects one sub-block. In this manner, eight selectors 55a–55h sequentially selects one sub-block at a time from one channel. Thus, for example, selectors 55a–55h selects in time sequence the sub-blocks from the flag adders in the order shown Table 1 below.

TABLE 1

| CH1 | 50a1 | 50a2 | 50a3 | 50a4 |
|-----|------|------|------|------|
|     | ↓    | ↓    | ↓    | ↓    |
| CH2 | 50b1 | 50b2 | 50b3 | 50b4 |
|     | ↓    | ↓    | ↓    | ↓    |
| CH3 | 50c1 | 50c2 | 50c3 | 50c4 |
|     | ↓    | ↓    | ↓    | ↓    |
| CH4 | 50d1 | 50d2 | 50d3 | 50d4 |
|     | ↓    | ↓    | ↓    | ↓    |
| CH5 | 50e4 | 50e1 | 50e2 | 50e3 |
|     | ↓    | ↓    | ↓    | ↓    |
| CH6 | 50f4 | 50f1 | 50f2 | 50f3 |
|     | ↓    | ↓    | ↓    | ↓    |
| CH7 | 50g3 | 50g4 | 50g1 | 50g2 |
|     | ↓    | ↓    | ↓    | ↓    |
| CH8 | 50h2 ↗ | 50h3 ↗ | 50h4 ↗ | 50h1 |

In the above example, the flag adders with a suffix "1", such as flag adder 50a1, add flag "1" indicating the leading sub-block, and the flag adders with suffix "2", "3" or "4" adds a flag "0" indicating the followers after the leading sub-block. Thus, when only the flags are considers in the above example, the flags will be aligned as follows:

1111 0000 0000 1100 0000 0010 0000 0001 . . . repeat

Figure 7:
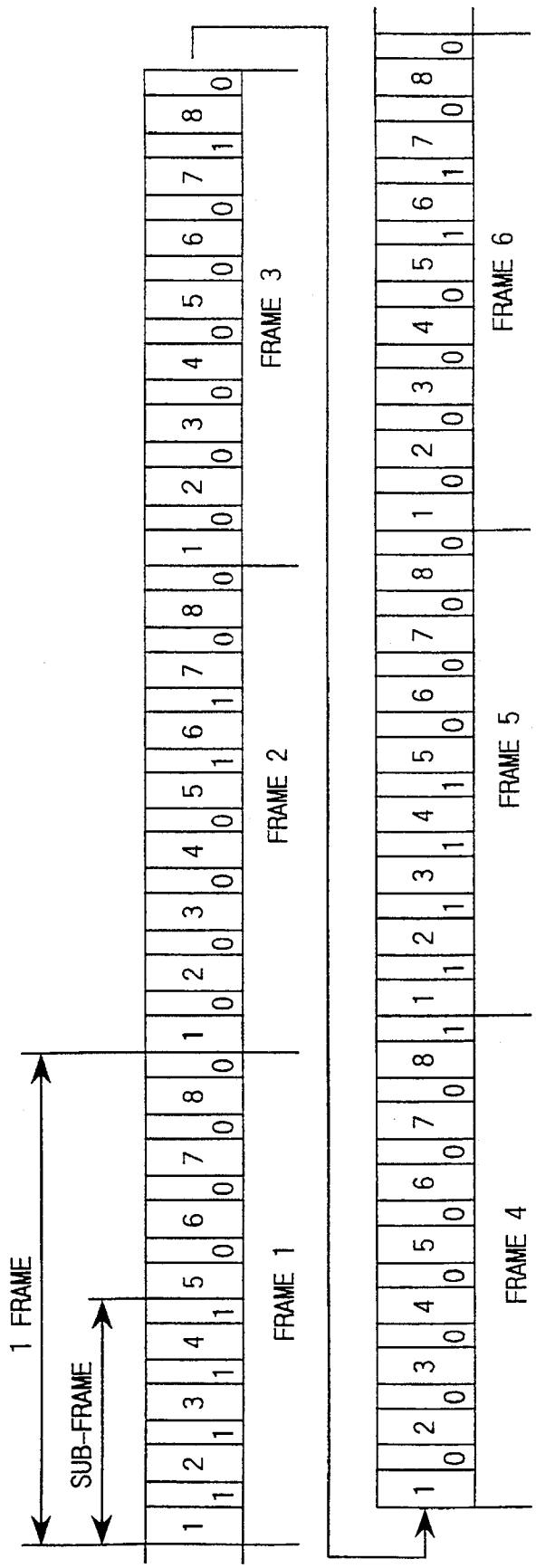
FIG. 7 shows the typical format of 8-channel multiplexing by the apparatus of the second embodiment, FIGS. 8A, 8B, 8C and 8D taken together as shown in FIG. 8 show a block diagram of a multiple channel multiplexing apparatus capable of channel substitution according to the third embodiment of the invention, FIGS. 9A, 9B, 9C and 9D taken together as shown in FIG. 9 show a block diagram of a multiple channel multiplexing apparatus capable of channel substitution according to the fourth embodiment of the invention, FIGS. 10A, 10B, 10C and 10D taken together as shown in FIG. 10 show a block diagram of a multiple channel multiplexing apparatus using sub-data according to the fifth embodiment of the invention, FIGS. 11A, 11B, 11C and 11D taken together as shown in FIG. 11 show a block diagram of a multiple channel multiplexing apparatus using sub-data according to the sixth embodiment of the invention.

This alignment is shown in FIG. 7. As apparent from the above example, the leading sub-blocks in different channels are not aligned. More specifically, in the above example, the leading sub-blocks in channels 1, 2, 3 and 4 are aligned, the leading sub-blocks in channels 5 and 6 are off-phase or delayed by one sub-block period from the sub-blocks in channel 1, the leading sub-block in channel 7 is delayed by two sub-block periods from the sub-blocks in channel 1, and the leading sub-block in channel 8 is delayed by three sub-block periods from the sub-blocks in channel 1. Such a delay is caused, e.g., by the time difference in the data compression effected in the compression circuits 13a–13h.

A multiplexer 52 is provided for generating sub-blocks aligned sequentially such as described above in connection with Table 1. In multiplexer 52, each sub-block is multiplexed to the specific area in each frame assigned to the channel associated with that sub-block. As a result, the channel number of each sub-block can be unconditionally determined from the position of the data in the frame.

Figure 5B:
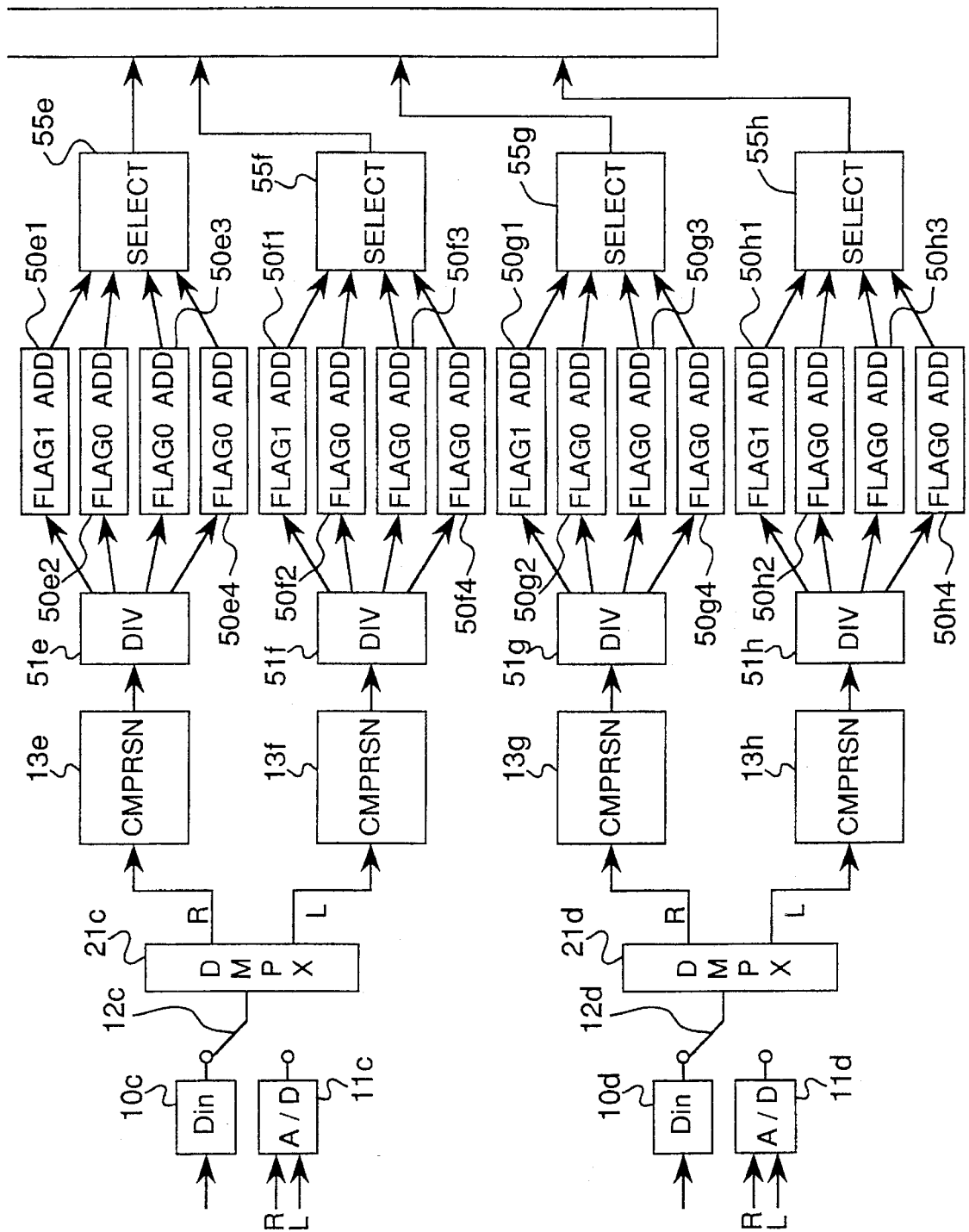
FIG. 5E is a block diagram showing a detail of the synthesizer shown in FIGS. 5C and 5D.
Figure 5C:
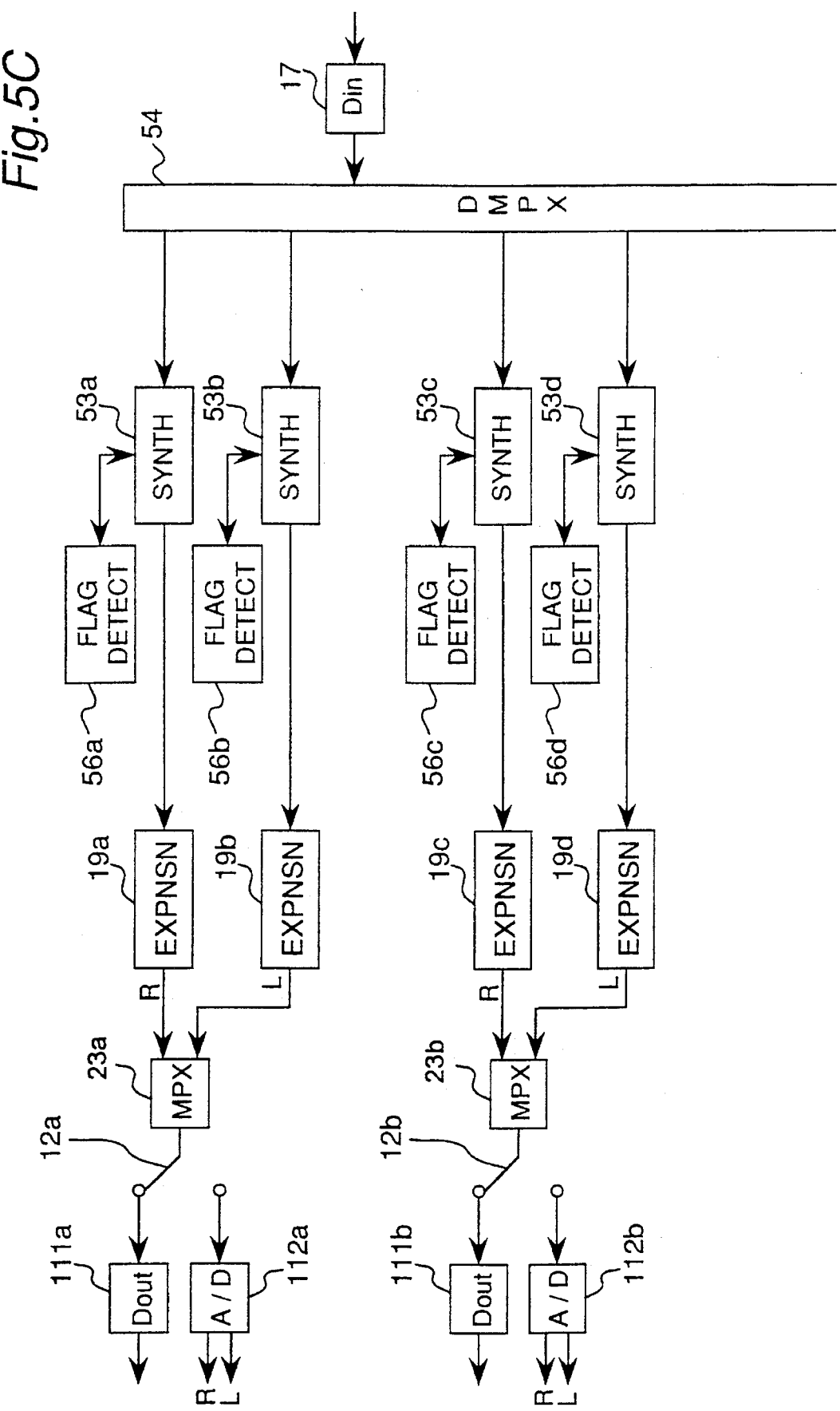

Referring to FIGS. 5C and 5D, the data expander portion comprises a demultiplexer 54 for demultiplexing the sub-blocks to separate channels. Since sub-blocks are multiplexed to the specific areas in each frame, demultiplexer 54 receives the sub-blocks assembled in the frames, as shown in FIG. 7. Thus, the channel number of each sub-block can be unconditionally determined from the position of the data in the frame.

In any case, the eight outputs of the demultiplexer 54 sequentially produce the sub-blocks in the same sequence as the sub-blocks applied to eight inputs of the multiplexer 52. The data expander portion further comprises eight data block synthesizers 53a–53h connected to the demultiplexer 54 for reassembling the sub-blocks to a block. Eight data block synthesizers 53a–53h are coupled with eight flag detectors 56a–56h, respectively.

Figure 5E:
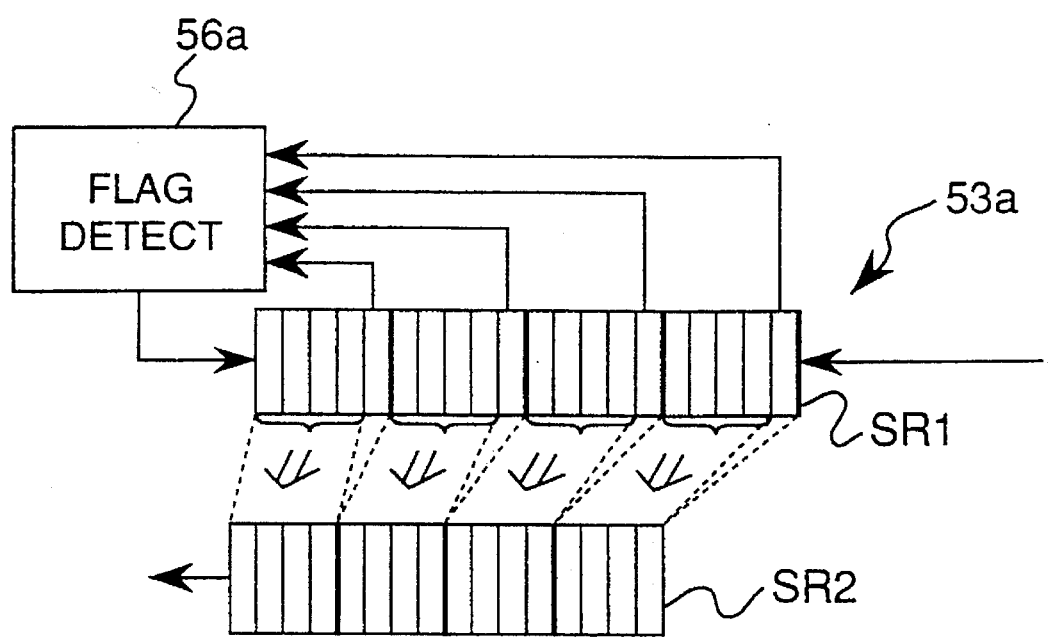

Referring to FIG. 5E, a detail of the synthesizer 53a is shown. The synthesizer 53a has a 20-bit shift register Sh1 and a 16-bit shift register Sh2. The 16-bit shift register Sh2 is connected parallel to the 20-bit shift register Sh1, but every fifth bit, which is the flag bit in the 20-bit shift register Sh1 is skipped. The flag bins in the 20-bit shift register Sh1 are applied to flag detector 56a. The flag detector 56a has a memory for storing a predetermined four-bit pattern, "1000". The four flag bits in the 20-bit shift register Sh1 are applied to the flag detector 56a for comparison with the predetermined four-bit pattern "1000". When the four flag bits matches the four-bit pattern, a shift command signal is produced from the flag detector 56a to the 20-bit shift register Sh1 for effecting the compressed audio data parallel shifting from 20-bit shift register Sh1 to 16-bit shift register Sh2. Other synthesizers are formed in the same manner.

Then, the 16-bit compressed audio data are shifted from the 16-bit shift register Sh2 to data expansion circuit 19a–19h.

The operation of the multiple channel multiplexing apparatus shown in FIGS. 5A–5D is described below with reference only to the differences in operation between the second and the first embodiment.

During compression and multiplexing, the eight channel data is compressed by the four data compression circuits 13a–13h and output as a 16-bit data block for each channel. The sub-block divider 51a–51h then divides each 16-bit data block into four 4-bit sub-blocks, to each of which the sub-block ID flag adding circuit 50a1–50a4 adds a sub-block identification flag, making each sub-block 5-bit long.

An example of the signal format is shown in FIG. 6, when the sub-block identification flags are added by the sub-block ID flag adding circuit 50a1–50a4 after sub-block division by the sub-block divider 51a–51h. The plural channel sub-blocks are then combined in sub-block groups and multiplexed to the AES/EBU digital audio interface by the multiplexer 52, as shown in FIG. 7.

FIG. 6 shows the signal format of four sub-blocks multiplexed with the sub-block identification flags, which are fit in to the 20-bit audio data portion. The 16-bit data block is divided ¼ into four sub-blocks of four bits each. A one bit sub-block identification flag is added to each sub-block, and the sub-blocks and sub-block identification flags of plural channels (four channels per sub-frame in this embodiment) are combined to form the sub-block group. The sub-block groups are stored to the audio data portion.

How these sub-block identification flags are used is described in detail with reference to FIG. 7 below.

FIG. 7 shows the signal format when eight channels coded to the format shown in FIG. 6 are multiplexed to the AES/EBU digital audio interface. In FIG. 7, all signal components other than the sub-frame audio data portions are omitted; the sequential numbers 1–8 shown in each frame indicate the channel number of the associated sub-blocks, but these channel numbers are not actually recorded or transferred in the preferred embodiment. This is because, as will be known from FIG. 7 and unlike in the first embodiment, each sub-block is multiplexed to the specific area in each frame assigned to the channel associated with that sub-block. As a result, the channel number of each sub-block can be unconditionally determined from the position of the data in the frame.

The sub-block identification flag values 0 and 1 are shown in the bottom right corner of each sub-block area in FIG. 7.

The purpose of these sub-block identification flags is for restoring the data blocks from the four sub-blocks into which they are divided. In this embodiment, as described above, the sub-block identification flag of the first sub-block at the beginning of the data block is a "1" with the sub-block identification flags of the following three sub-blocks being "0". In channels 1–4 in FIG. 7, the sub-block identification flags in frame 1 are 1, and in frames 2, 3, and 4 are 0. As a result, the sub-blocks composing the data block of channel 1, for example, is known to start in frame 1 and be in frames 1, 2, 3, and 4. The sub-block identification flag is reset to 1 in frame 5, and it can therefore be determined that a new data block starts from frame 5. It is also known that for channels 5 and 6, the data block starts from frame 2.

Note that while the sub-block identification flags are assigned per channel in this embodiment, the number of sub-block identification flags can be reduced if the positions of the first sub-block in each data block are aligned through the plural channels using a memory delay or other means. For example, if all eight channels can be aligned, a one bit sub-block identification flag for all eight channels is sufficient. In addition, while the sub-block identification flags are added at the end of each sub-block in the sub-block groups, it is also possible to group just the sub-block identification flags on the MSB side or the LSB side.

The data multiplexed by the multiplexer 52 as described above is then modulated by the $D_{out}$ 16 of the data compressor portion, and line output. When the multiple channel multiplexing apparatus is connected to a video device as shown in FIG. 2 or to a digital audio recorder, the multiplexed output signal can be recorded by the connected device.

In the data expander portion, the signal from the $D_{in}$ 17 is input to the demultiplexer 54 which separates the sub-blocks for each channel from the sub-block groups of the signal input from the $D_{in}$ 17. Because the channel number can also be determined from the sub-block positions in the sub-block groups as shown in FIG. 7, the channel number information is also output from the demultiplexer 54 together with the data blocks. Based on this channel number information, the synthesizers 53a–53h combines four sub-blocks to form one data block which is supplied to the corresponding data expansion circuits 19a–19h. The data expansion circuit 19a–19h expands the data blocks to restore and output the original digital audio data.

It is to be noted that the sequence of the data block synthesizer 53a–53h and demultiplexer 54 can be reversed from that shown in FIGS. 5c and 5d.

The number of sub-blocks into which the data blocks are separated is considered next. While each data block is divided into four sub-blocks and multiplexed to four frames as shown in FIG. 7 in this embodiment, it is also possible, for example, to divide each data block into two sub-blocks and insert these two sub-blocks to two of four consecutive frames, leaving the remaining two frames open. In other words, any number of sub-blocks greater than or equal to two and less than or equal to the number of samples in each data block before compression can be used.

Hereafter, the method described in the second embodiment above whereby data blocks of M linearly quantized digital audio data samples data compressed 1/N are divided into L sub-blocks (where L is an integer of two or greater and less than or equal to M) to which a sub-block identification flag identifying the arrangement of the sub-blocks is added, and multiplexed by insertion across M frames to a specific position assigned to each channel in each frame, is referred to as the "second multiplexing method." In the preferred embodiment, L=4.

As described above, multiplexing and demultiplexing can be correctly executed in both the first embodiment using the first multiplexing method and the second embodiment using the second multiplexing method without destroying the data block units during the multiplexing process even when multiplexing using data compression/expansion preserving the data block concept in the compressed data is used.

Note, further, that in a multiple channel multiplexing apparatus multiplexing plural channels it is desirable to be able to substitute selected channels in the reproduced multiplexed data, and then re-record to the digital recorder. To replace selected channels from the plural channel multiplexed data, it is necessary to replace only the desired data while leaving part of the already multiplexed data. A multiple channel multiplexing apparatus of the first multiplexing method and a multiple channel multiplexing apparatus of the second multiplexing method whereby channel substitution is possible are described below.

When one of the eight specific channels multiplexed as shown in FIG. 4 as stored in a tape by a VCR according to the first multiplexing method is to be substituted, it is necessary to identify the channel to be substituted from the channel data, replace only the subframe of the corresponding channel number with new data while replaying the tape, and leave the rest of the channel data undisturbed.

To effect this channel substitution using the multiple channel multiplexing apparatus shown in FIGS. 1A–1D and described above, the data expander portion $D_{out}$ 111a–111d terminals of the channels to remain can be connected to the data compressor $D_{in}$ 10 terminals of the data compressor portion to re-route the data while inputting the data of the channels to be substituted to the $D_{in}$ 10a–10d or A/D converter 11a–11d terminals of the data compressor portion. As a result, the multiplexed data input to the $D_{in}$ 17 of the data expander portion is partially replaced and output again from the $D_{out}$ 16 of the data compressor portion.

The problem with this operation is that the data not substituted passes once through both the data expansion circuit 19a–19h and the data compression circuit 13a–13h. Audio data quality deteriorates when data compression/expansion are repeated, and a time delay also occurs. While the unsubstituted data is returned through the digital inputs/outputs in the above example, repeated D/A conversion and A/D conversion in addition to data compression/expansion further deteriorates signal quality if the analog inputs/outputs are used, and the time delay increases further. As a result, when channel substitution is used, it is necessary to consider some means of re-using the compressed digital data without passing the data through expansion, compression, A/D and D/A conversion means so that the unsubstituted data does not deteriorate BO and a time delay is not introduced.

Referring to FIGS. 8A–8D a block diagram of a multiple channel multiplexing apparatus according to the third embodiment of the invention is shown, which uses the first multiplexing method shown in FIGS. 1A–1D and enabling channel substitution without deteriorating the signals of the unsubstituted channels. Common elements in FIGS. 1A–1D and 8A–8D are identified by like reference numbers, and further description is omitted below. FIG. 8 shows the relationship between FIGS. 8A, 8B, 8C and 8D.

Figure 8B:
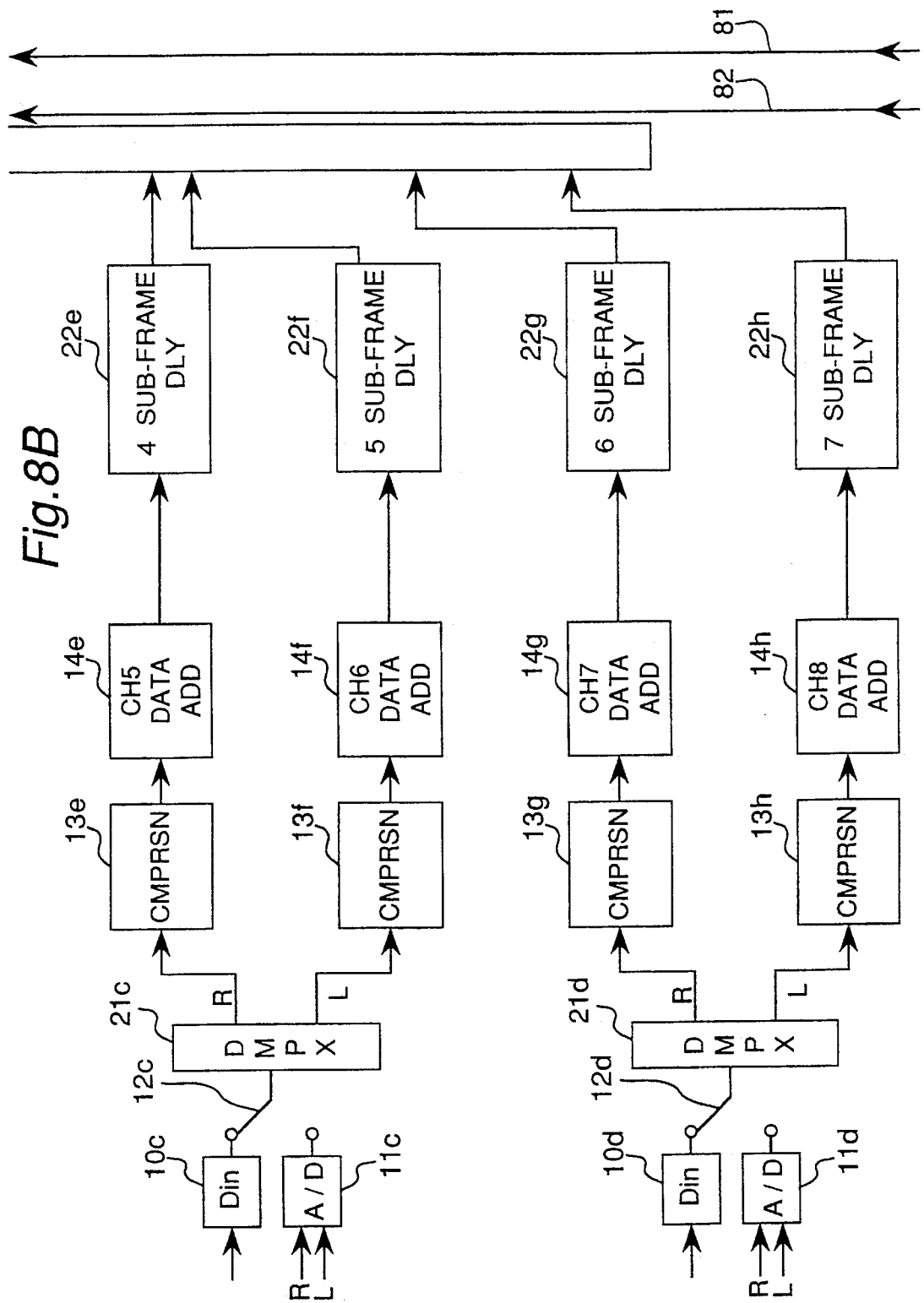
Figure 8C:
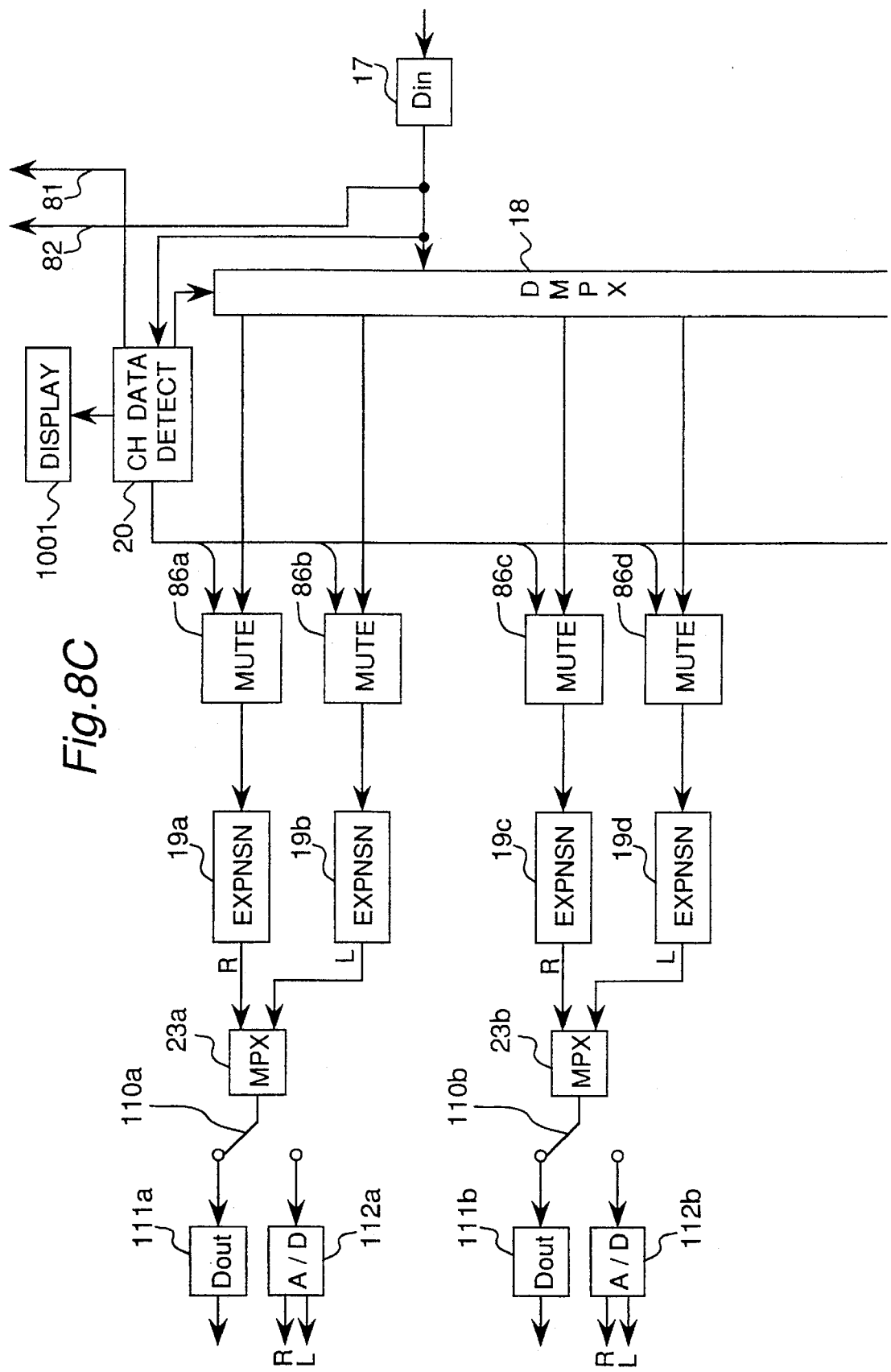
Figure 9B:
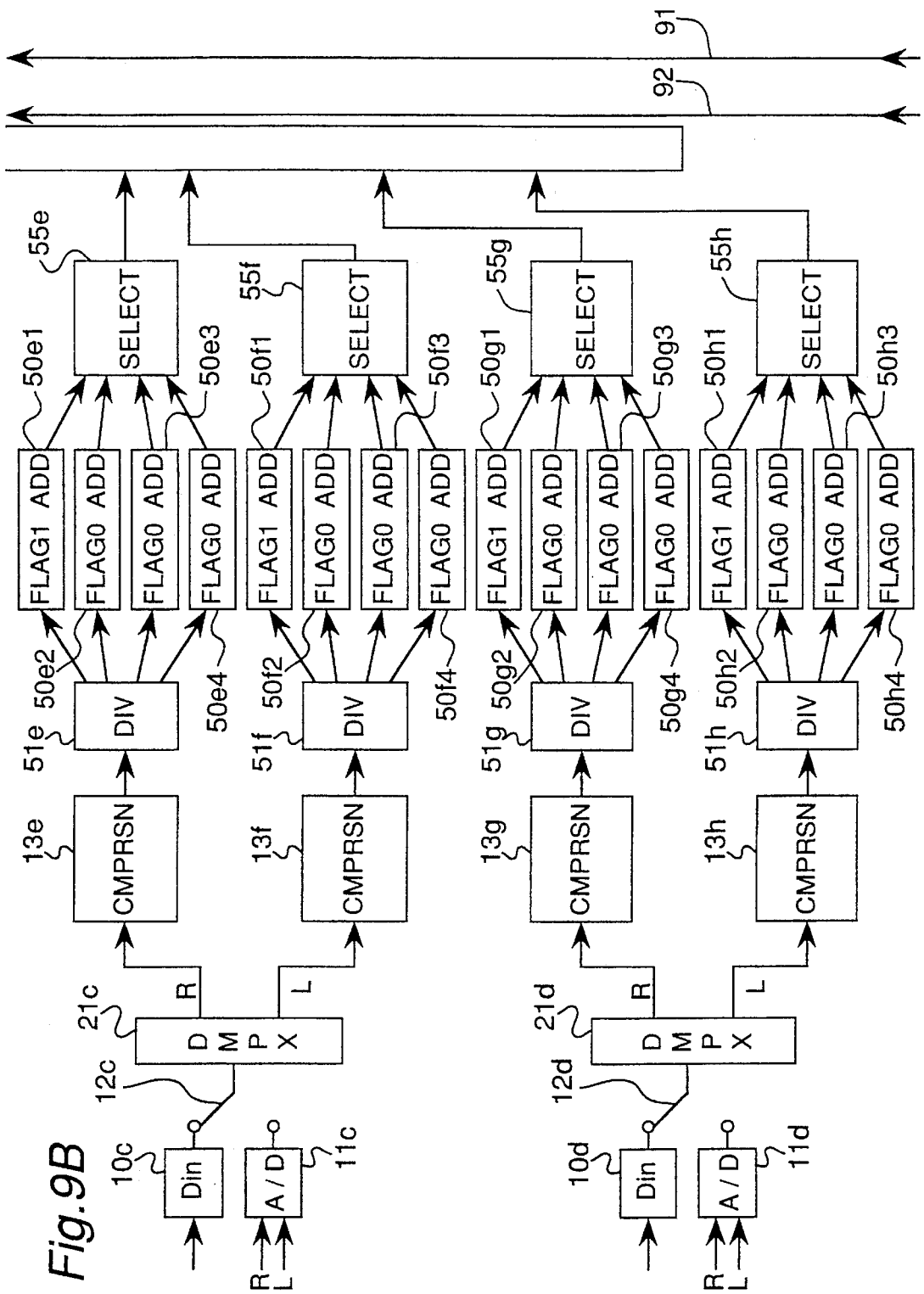

As shown in FIGS. 8C and 8D, the data expander portion of this embodiment comprises an channel data detector 20 for monitoring the continuity and periodicity of the channel data, and outputting the detected states; and a muting circuits 86a–86h for braking the channel line when the proper channel data is not detected.

In the data compression portion, a second multiplexer 85 is provided for receiving data from the first multiplexer 15. Also an external channel selector switch 83 is provided for selecting a channel that should receive substitute data.

The data compressor portion and data expander portion are connected by signal line 81 on which the channel data is output from the channel data detector 20 to the multiplexer 85, and a signal line 82 connecting the $D_{in}$ 17 of the data expander portion to the multiplexer 85.

Unlike the multiplexer shown in FIGS. 1A–1D, this multiplexer 85 is characterized by the input from signal line 82 in addition to the inputs from the first multiplexer 15. This multiplexer 85 can replace the data on signal line 82 in certain channel(s) designated by the channel selector 83 with new data from the channel data adder 14a–14h.

The channel substitution operation of this embodiment is described below with reference to FIGS. 8A–8D. Other aspects of the operation of this embodiment are the same as in the multiple channel multiplexing apparatus of FIGS. 1A–1D, and further description is omitted below.

The multiplexed data input to the $D_{in}$ 17 of the data expander portion is input from the VCR under its replay mode to the demultiplexer 18. The channel data detector 20 monitors the continuity and periodicity of the channel data, and successively outputs the detected channel data to the multiplexer 85 via signal line 81. This signal is the channel number that changes continuously and cyclically from 0–7 representing channel 1 to channel 8, when the signal format shown in FIG. 4 is used. The reproduced data from the VCR and input to the $D_{in}$ 17 of the data expander portion is also sent to the multiplexer 85 via signal line 82.

It is assumed that the data in channel 3 is to be replaced, so that the channel selector 83 produces a data indicative of channel 3. In the multiplexer 85, the reproduced data input from signal line 82 is fed back to the VCR for recording through $D_{out}$ 16 except when data of channel 3 is present. When data of channel 3 is present, the multiplexer 85 switches to select new data from multiplexer 15 particularly the data from channel 3 through elements 22c, 14c, and 13c. Thus, the data in channel 3 is replaced in the multiplexer 85 with the data from the channel data adder 14c. The multiplexer 85 operates to change the path in response to the channel number data from signal line 81, and can therefore correctly substitute only the selected channel(s). The signal produced from $D_{out}$ 16 is recorded in the VCR. To substitute, for example, only CH3 in the multiplexed data shown in FIG. 4, data is replaced every eight subframes. The digital values of the unchanged data are simply throughput, thereby preventing any signal deterioration and time delay.

Channel substitution using the second multiplexing method is described next. When one or more of the eight channels multiplexed with the second multiplexing method as shown in FIG. 7 is substituted, the channel number can be determined from the position in the frame of the AES/EBU digital audio interface. This does not tell, however, from which frame position channel substitution should begin. Consider the case in which recording is continued from previously recorded multiplexed channels. Channel substitution must begin so that the previously multiplexed channel data is not destroyed at the channel substitution starting point. It is therefore necessary to set the channel substitution starting point to match the divisions of the sub-block-divided data blocks, and thus prevent data block destruction.

If the alignment is not correct, substitution will begin from the middle of the four sub-blocks, causing part of the four sub-block group to be replaced by a new sub-block and making it impossible to re-assemble the data block. To prevent data block destruction, it is necessary to recognize the sub-block identification flag of the channel to be replaced and thus begin inserting the new data from the data block division of the channel to be replaced.

FIGS. 9A–9D show a block diagram of a multiple channel multiplexing apparatus according to the fourth embodiment of the present invention using the second multiplexing method and enabling channel substitution without signal deterioration. Common elements in FIGS. 5A–5D and 9A–9D are identified by like reference numbers, and further description is omitted below. FIG. 9 shows the relationship between FIGS. 9A, 9B, 9C and 9D.

As shown in FIGS. 9A–9D, the data expander portion of this embodiment has the flag detectors 56a–56h for monitoring the continuity and periodicity of the sub-block identification flags, and outputting the detected states; and a muting circuits 96a–96h for braking the channel line when the proper channel data is not detected.

The data compressor portion also contains a second multiplexer 95 for substituting the data of the channel selected by the external channel selection switch 93.

The data compressor portion and data expander portion are connected by signal line 91 on which the sub-block identification flag is transmitted from the ID flag detectors 56a–56h to the multiplexer 95, and a signal line 92 connecting the $D_{in}$ 17 of the data expander portion to the multiplexer 95.

Unlike the multiplexer shown in FIGS. 5A–5D, this multiplexer 95 is characterized by the input from signal line 92 in addition to the inputs from the first multiplexer 52. This multiplexer 95 can replace the sub-blocks of the channel(s) in the multiplexed data on signal line 92 selected by the channel selection switch 93 with the data from the multiplexer 52.

The channel substitution operation of this embodiment is described below with reference to FIGS. 9A–9D. Other aspects of the operation of this embodiment are the same as in the multiple channel multiplexing apparatus of FIGS. 5A–5D, and further description is omitted below.

The reproduced data from VCR is input to the $D_{in}$ 17 of the data expander portion. The ID flag detectors 56a–56h monitor the continuity and periodicity of the sub-block identification flags, and successively outputs the data block starting position of each channel to the multiplexer 95 via signal line 91. The reproduced data input to the $D_{in}$ 17 of the data expander portion is also sent to the multiplexer 95 via signal line 92.

In the multiplexer 95, channel substitution is effected when the channel(s) to be substituted are selected by the channel selector switch 93. During this operation, the multiplexer 95 receives the signal indicative of the starting point of the sub-blocks of the channels currently being reproduced along the signal line 92 based on the sub-block starting point information for each channel input from signal line 91.

It is assumed that the third channel data should be substituted. When the flag detector 56c detects the sub-block starting point of the third channel CH3, the multiplexer 95 that has been selecting data from line 92, now selects block data from multiplexer 52. The signal produced from $D_{out}$ 16 is recorded in the VCR. Thus, channel substitution can be started and executed without destroying any existing data blocks. The digital values of the unchanged data are simply throughput, thereby preventing any signal deterioration and time delay.

The problems that occur, and how to resolve them, when a data block of the multiplexed data is destroyed are described below.

In any transfer system such as the digital audio interface, errors can be caused by environmental factors, and the data quality can deteriorate. When this digital audio interface is connected to a video device as shown in FIG. 2, read/write errors can also occur in the data recording/reproduction system. When this occurs, the multiple channel multiplexing apparatus cannot extract or restore data blocks in the input multiplexed data, data expansion is therefore not possible, and the end result is perceived as noise.

To prevent this, the third embodiment of the invention using the first multiplexing method as shown in FIGS. 8A–8D can be used as follows.

The multiple channel multiplexing apparatus in FIGS. 8A–8D comprises muting circuits 86a–86h controlled by the channel data detector 20. The operation of all other components has already been described, and is therefore omitted below. The channel data detector 20 monitors the continuity and periodicity of the channel data. When the signal format shown in FIG. 4 is used, channel numbers changing continuously and cyclically from 0–7 are detected.

If any given channel number cannot be read, and therefore is not detected, there is a strong possibility that the data blocks for that channel are destroyed. Any undetected channel number can be detected from the relationship of the undetected channel number to the detected channel numbers before and after, and this information can be output from the channel data detector 20 to the muting circuit 86a–86h. If, for example, it is the fifth channel CH5 that cannot be detected, the muting circuit 86a–86h can mute the output of fifth channel accordingly, and thus prevent the generation of noise signal caused by data block destruction.

In other words, during a normal replay mode of the VCR, when the channel data detector 20 detects an error in the fifth channel data, a cut off command signal is applied to the corresponding muting circuit 86e for braking the line in the corresponding channel. Thus, undesirable noise signal will not be transmitted to the corresponding output.

It is to be noted this embodiment mutes only the channel determined by the channel data detector 20 to be destroyed, but because data block destruction may also indicate general deterioration of overall signal quality, it is also possible to force the muting circuit 86 to mute all channels simultaneously.

The fourth embodiment of a multiple channel multiplexing apparatus using the second multiplexing method is described further below with reference to FIGS. 9A–9D.

The multiple channel multiplexing apparatus in FIGS. 9A–9D comprises muting circuits 96a–96h controlled by the flag detector 56. The operation of all other components has already been described, and is therefore omitted below. The flag detector 56 monitors the continuity and periodicity of the sub-block identification flags. When signal format shown in FIG. 7 is used, the detected sub-block identification flags vary in a regular cycle, i.e., a sub-block identification flag value of 1 every four sub-blocks in each channel followed by three sub-block identification flags with a value of 0.

It is assumed here that the normal cycle of the sub-block identification flags for a given channel is disrupted. When this happens, it is not possible to rebuild the data blocks from the sub-blocks for that channel, and the data block(s) is effectively destroyed. When this happens, the flag detector 56 sends this information to the corresponding muting circuit 96a–96h. The muting circuit 96a–96h then mutes the output from the corresponding channel based on this information to suppress noise signal caused by data block destruction.

It is to be noted this embodiment mutes only the channel determined by the flag detector 56 to be destroyed, but because data block destruction may also indicate general deterioration of overall signal quality, it is also possible to force the muting circuits 96a–96h to mute all channels simultaneously.

In addition, while both a channel substitution function and muting function are provided in the configurations shown in FIGS. 8A–8D and 9A–9D, it is also possible to provide only one of these functions.

Furthermore, depending on how the multiple channel multiplexing apparatuses described above are used, data will not necessarily be multiplexed to all channels. Listening to the audio after data expansion is the only way to determine whether data is muitiplexed to any channel, but even this is not possible if silence is recorded. To improve the ease of use, it is therefore necessary notify the user which channels are already multiplexed to the multiplexed data.

As shown in FIGS. 8A–8D, the multiple channel multiplexing apparatus further comprises a display 1001. The display 1001 comprises light-emitting diodes (LEDs) corresponding to the multiplexed channels; these LEDs individually light steady or are off according to the multiplexed state of the corresponding channel.

The unique aspects of the operation of the multiple channel multiplexing apparatus are described below.

The channel data detector 20 monitors the continuity and periodicity of the channel data. These channel data are the channel number, which changes continuously and cyclically from 1–8 when the signal format shown in FIG. 4 is used. There are cases, however, in which the detected channel number differs from the channel number that should come next in the normal cycle. When this occurs, it can be determined that data is not multiplexed to the missing channel number.

When the display 1001 receives information indicating the irregularity of the continuity and periodicity of the channel data for a certain channel, the display 1001 lights the LED corresponding to that channel and leaves the other LEDs off. The user can thus determine from the LEDs to which of the multiplexed channels data is multiplexed and to which data is not multiplexed. For example, when the second multiplexer 85 as shown in FIG. 8A is provided, the user can easily know what channel(s) (e.g., open channels) is to be replaced, and can therefore prevent such operational errors as multiplexing over a previously multiplexed channel, because the data in the open channel has no channel data.

The operation of a similar multiple channel multiplexing apparatus using the second multiplexing method is described next.

As shown in FIGS. 9A–9D, this multiple channel multiplexing apparatus further comprises a display 1202. The display 1202 comprises light-emitting diodes (LEDs) corresponding to the multiplexed channels; these LEDs individually light steady or are off according to the multiplexed state of the corresponding channel every four channels.

The unique aspects of the operation of the multiple channel multiplexing apparatus are described below.

The flag detector 56a–56h monitors the continuity and periodicity of the sub-block identification flags. When the signal format shown in FIG. 7 is used, the periodicity of the sub-block identification flags which become 1 once every cycle of four sub-blocks in each channel is monitored. It is assumed here, however, that there is a channel for which the sub-block identification flags, which should change on this regular cycle, do not change. When this occurs, it can be determined that data is not multiplexed to that channel.

When the display 1202 receives information indicating the irregularity of the continuity and periodicity of the sub-block identification flags for a certain channel, the display 1202 lights the LED corresponding to that channel and leaves the other LEDs off. The user can thus determine from the LEDs to which of the multiplexed channels data is multiplexed and to which data is not multiplexed. For example, when the multiplexer 95 is provided, the user can easily know what channel(s) (e.g., open channels) is to be replaced, and can therefore prevent such operational errors as multiplexing over a previously multiplexed channel, because the data in the open channel has no flag.

While there are cases where digital audio data is compressed and multiplexed as described in the above embodiments to the audio data sub-frames of the digital audio interface, uncompressed linearly quantized digital audio data is generally transferred. When such uncompressed linearly quantized digital audio data is received, the multiple channel multiplexing apparatuses of the above embodiments will generate noise. A method of correcting this problem is described below.

Figure 12:
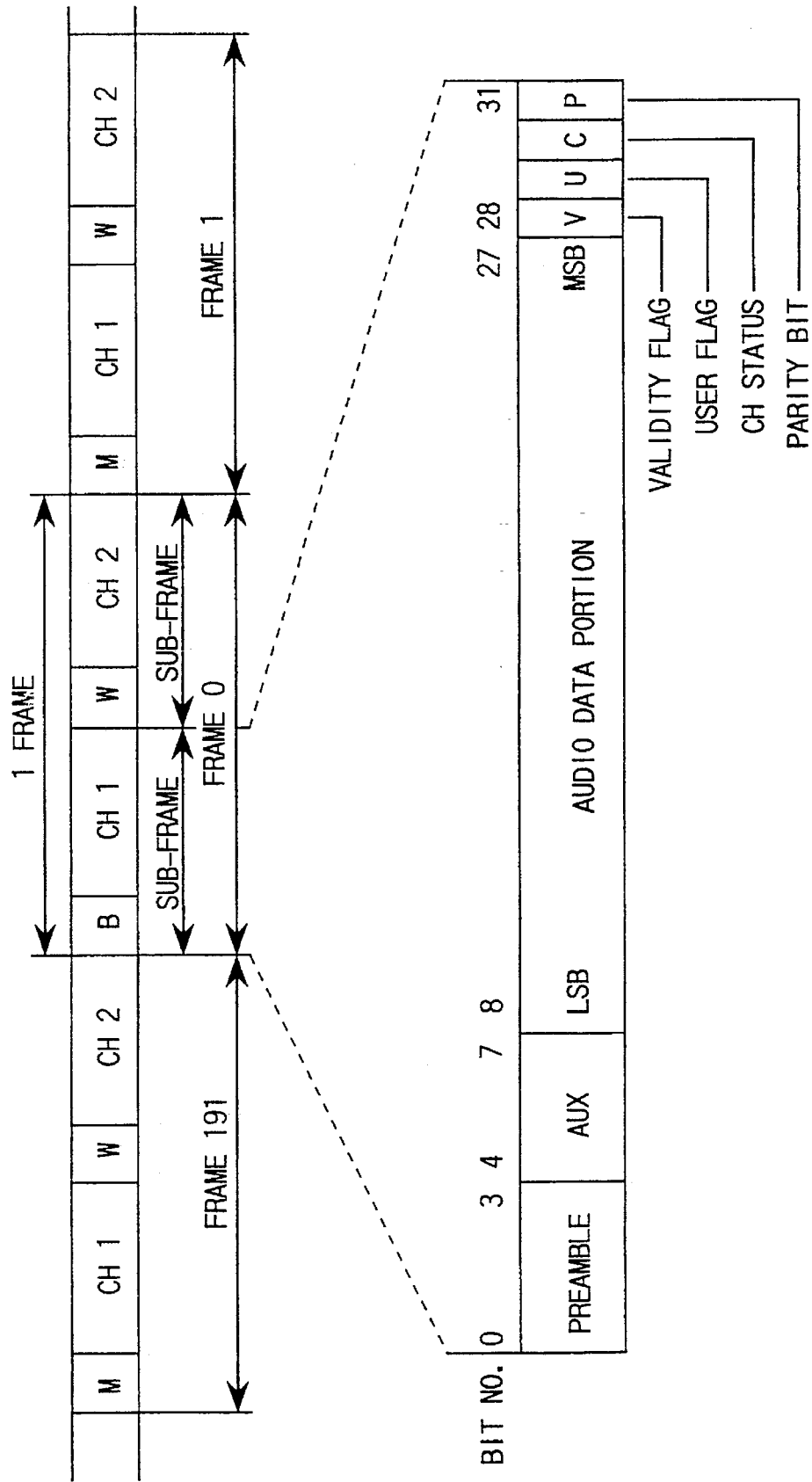
FIG. 12 is a diagram showing the signal format of the AES/EBU digital audio interface according to the prior art.
Figure 13:
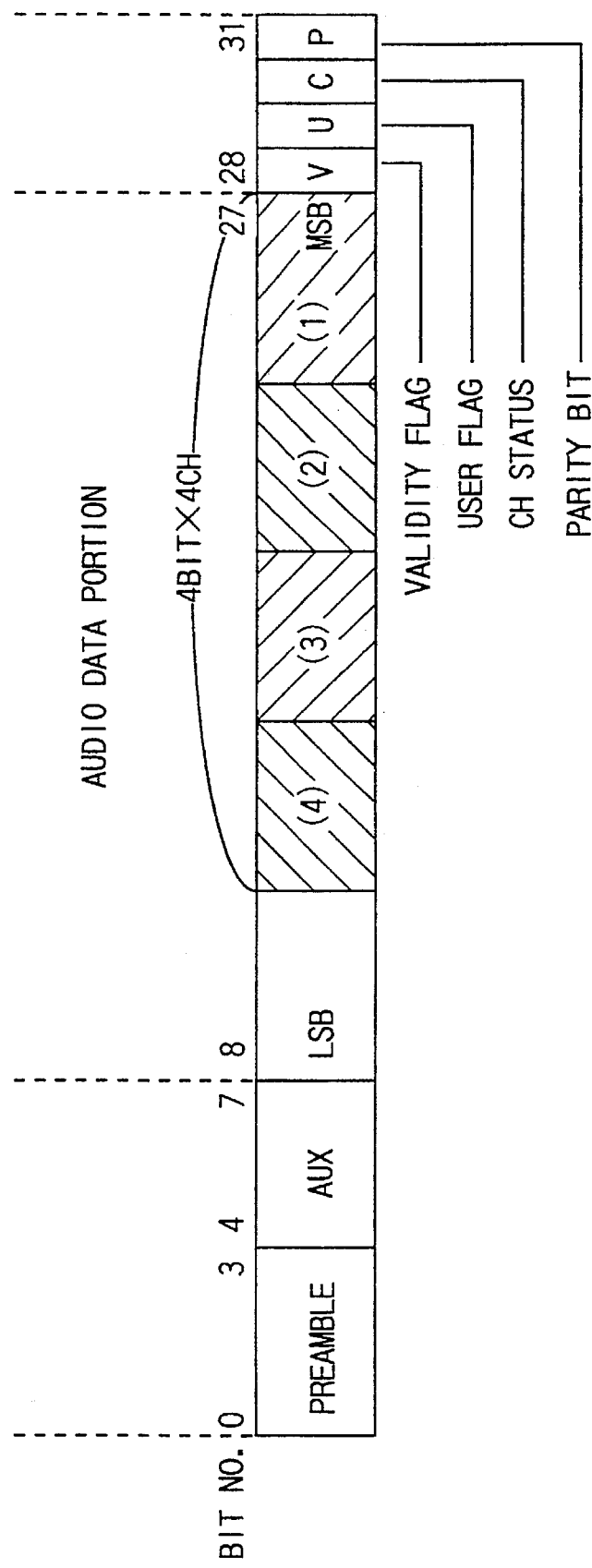
FIG. 13 shows the format of the signal channel multiplexed to the AES/EBU digital audio interface according to the prior art.
Figure 14:
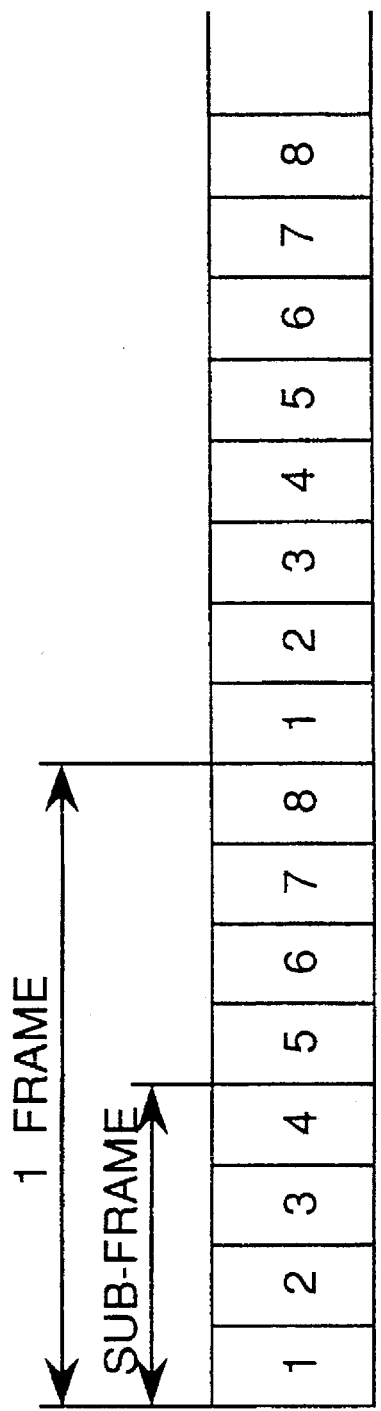
FIG. 14 shows eight channel multiplexing according to the prior art.
Figure 15:
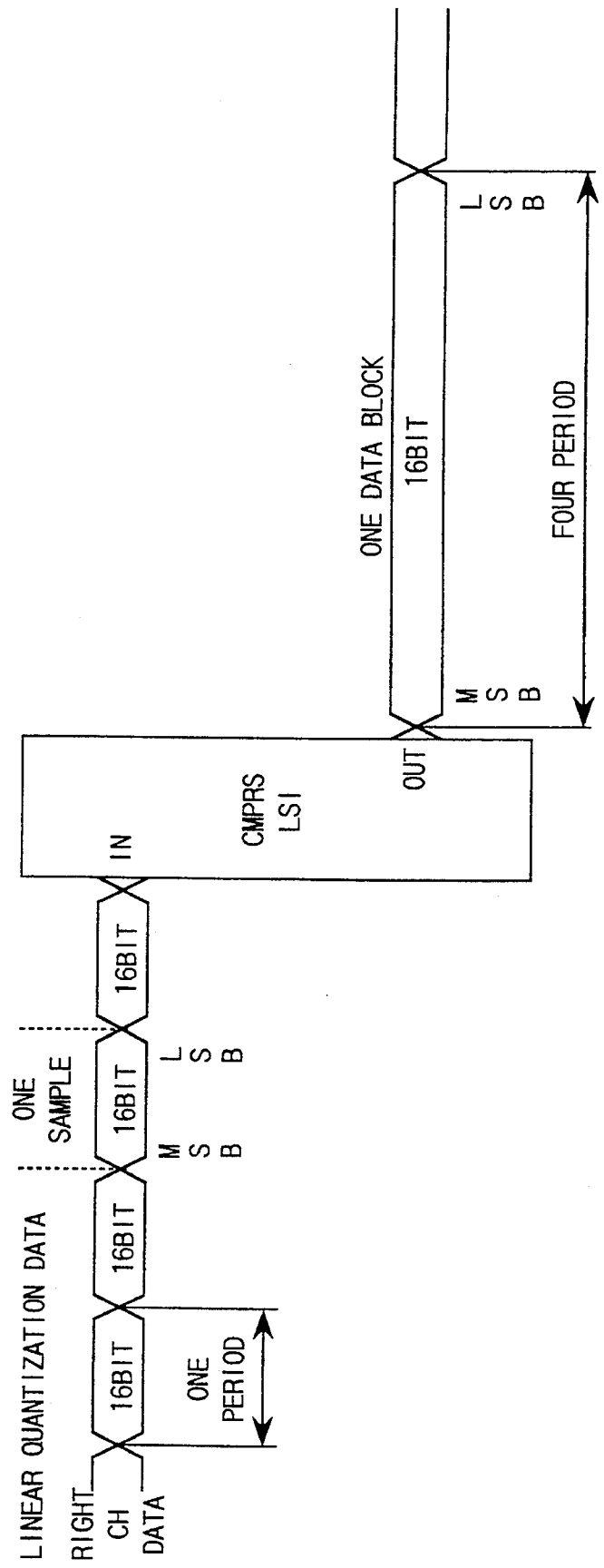
FIG. 15 shows the data block concept according to the prior art.

The AES/EBU digital audio interface used in the above embodiments also contains sub-data indicated as U, V, C, and P in FIG. 12. Sub-data C (channel status) includes a portion of data for determining whether or not the data written to the audio data frame is uncompressed linearly quantized digital audio data. In the two embodiments described below, this portion of data is used to apply muting and thus resolve the noise problem while also displaying the data state to notify the user.

FIGS. 10A–10D show a block diagram of a multiple channel multiplexing apparatus using the first multiplexing method and resolving the above problems according to the fifth embodiment of the invention. Common elements in FIGS. 1A–1D and 10A–10D are identified by like reference numbers, and further description is omitted below. FIG. 10 shows the relationship between FIGS. 10A, 10B, 10C and 10D.

Figure 10B:
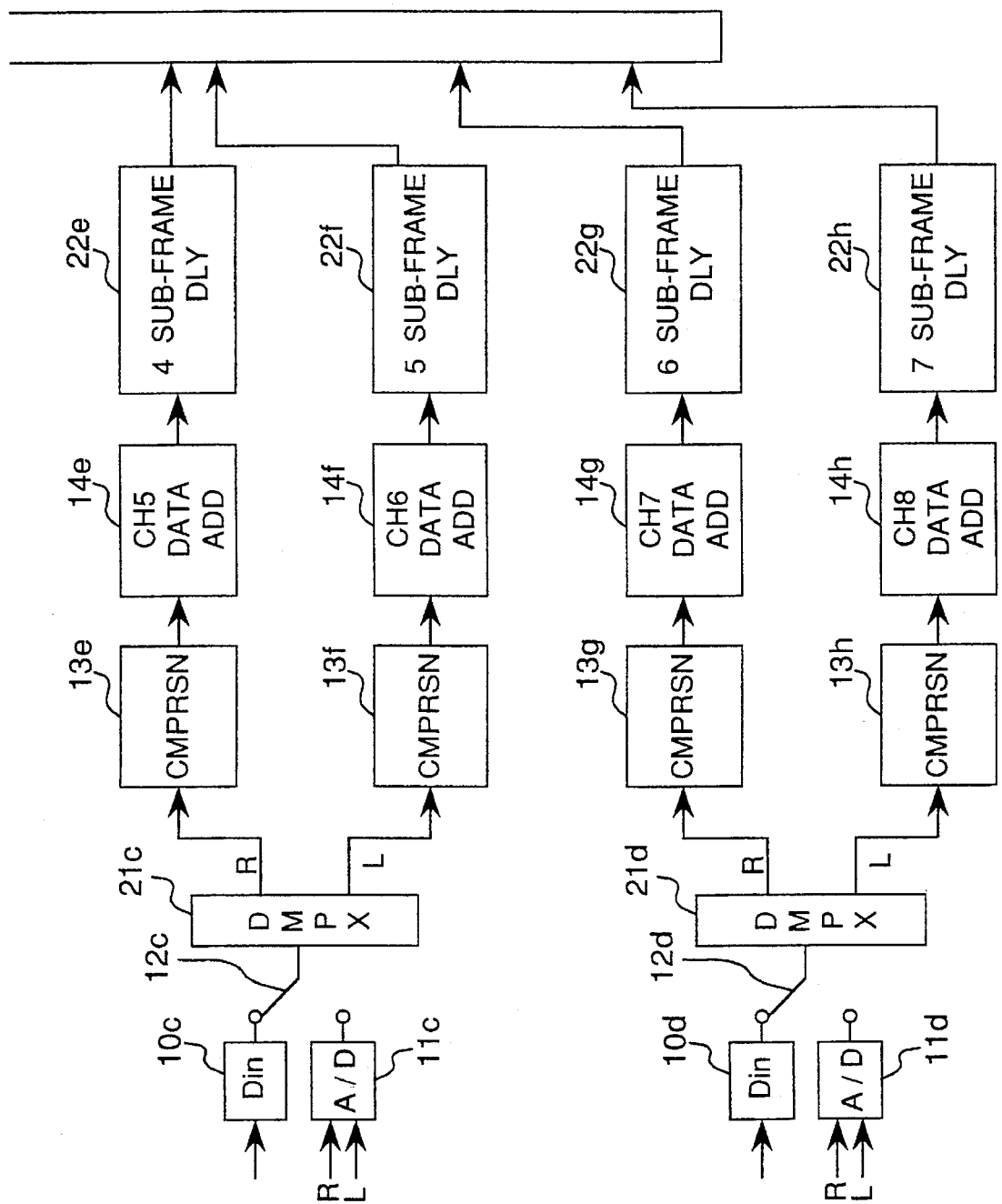

As shown in FIGS. 10A and 10B, the data compressor portion of this embodiment further comprises a sub-data insertion circuit 1101, such as a multiplexer, for inserting to the sub-data section a portion of data indicating whether the data in the audio data frame is linearly quantized digital audio data.

Figure 10D:
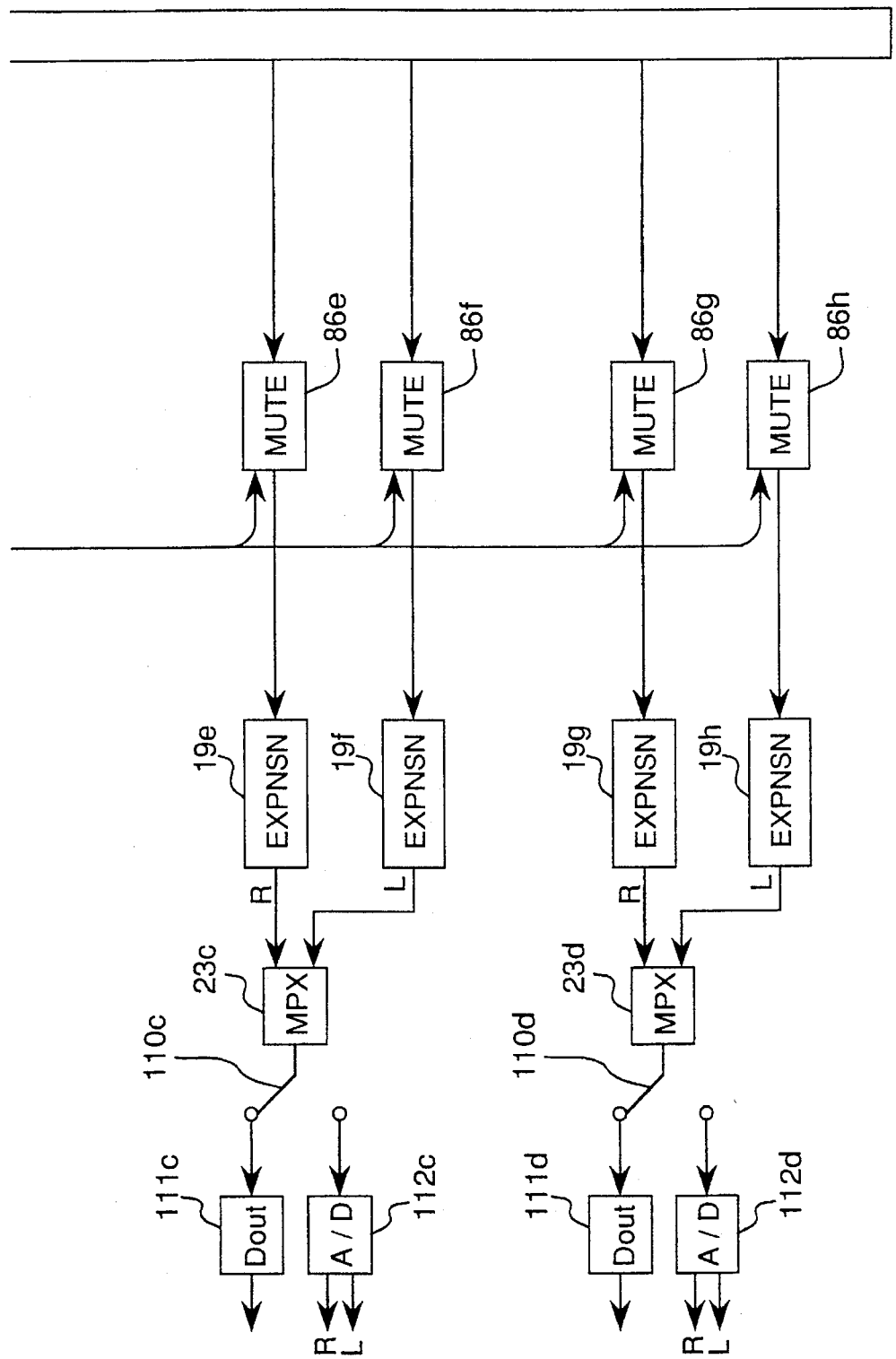

As shown in FIGS. 10C and 10D, the data expander portion further comprises a sub-data detector 1102 for detecting the portion of data in the sub-frame; a display 1103 for displaying the output of the sub-data detector 1102; and a muting circuits 86a–86h controlled by the output from the sub-data detector 1102. The display 1103 comprises an LED for displaying whether the data in the audio data sub-frame is linearly quantized digital audio data by lighting the LED when linearly quantized digital audio data is present and otherwise turning the LED off.

The display and muting operations of the apparatus shown in FIGS. 10A–10D are described below. Further description of operations common to the apparatus shown in FIGS. 1A–1D is omitted.

Because the data multiplexed to the audio data section is not linearly quantized digital audio data, the sub-data insertion circuit 1101 multiplexes this information to the sub-data of the digital audio interface. In the data expander portion, the data input from the $D_{in}$ 17 is also input to the sub-data detector 1102, which references the portion of data in the sub-data section to determine whether the input data is linearly quantized digital audio data. If linearly quantized digital audio data is erroneously input, the display 1103 lights to notify the user of an input signal error. If the linearly quantized digital audio data is mistakenly expanded and output, noise signal may be produced. To prevent this, the muting circuits 86a–86h brake the output signals.

A similar apparatus using the second multiplexing method is described below.

FIGS. 11A–11D shows a block diagram of a multiple channel multiplexing apparatus according to the sixth embodiment of the invention, which uses the second multiplexing method and obtaining the same effect as the fifth embodiment of the invention. Common elements in FIGS. 5A–5D and 11A–11D are identified by like reference numbers, and further description is omitted below. FIG. 11 shows the relationship between FIGS. 11A, 11B, 11C and 11D.

Figure 11B:
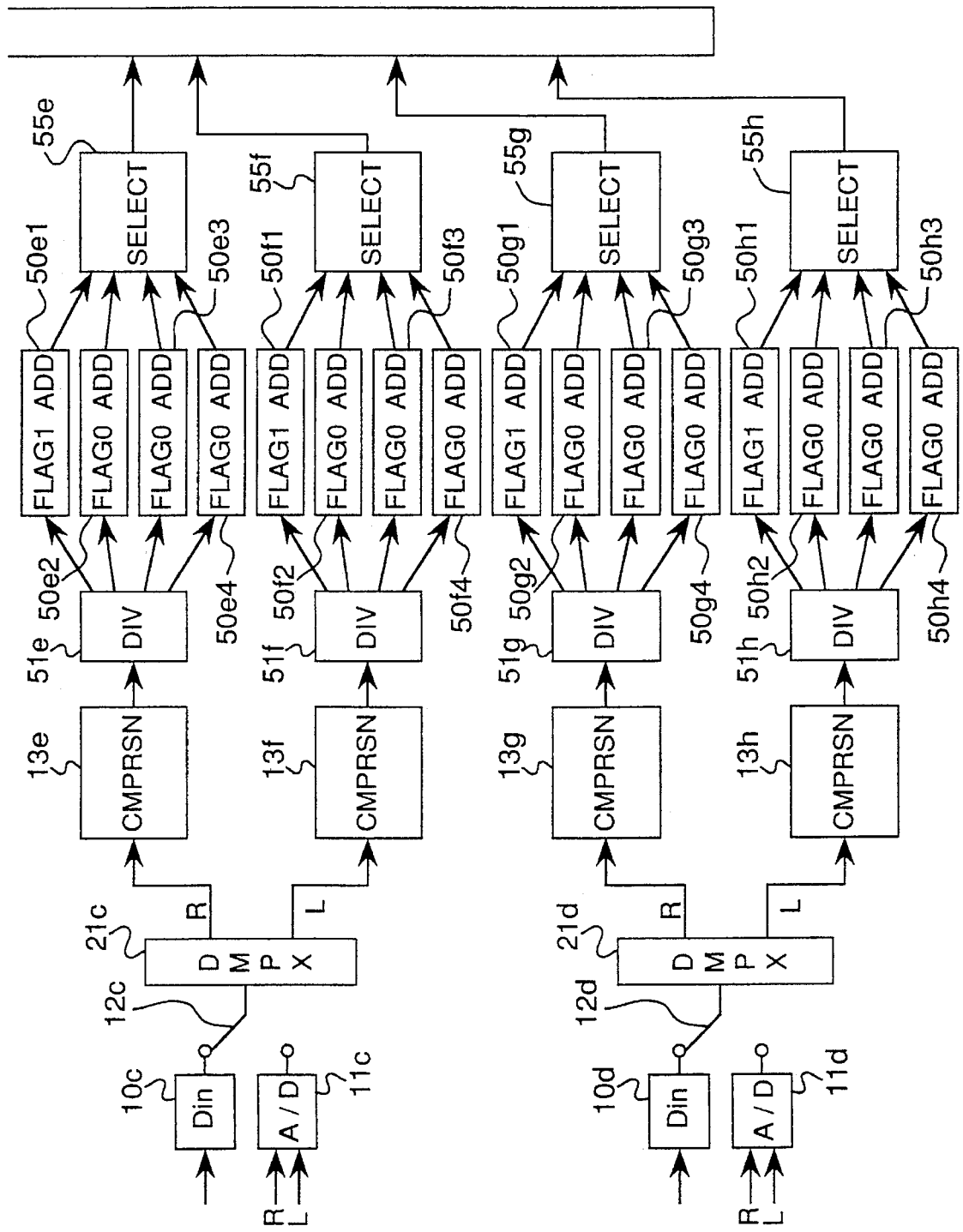

As shown in FIGS. 11A–11B, the data compressor portion of this embodiment further comprises a sub-data insertion circuit 1301 for multiplexing to the sub-data section a portion of data indicating whether the data in the audio data sub-frame is linearly quantized digital audio data.

Figure 11C:
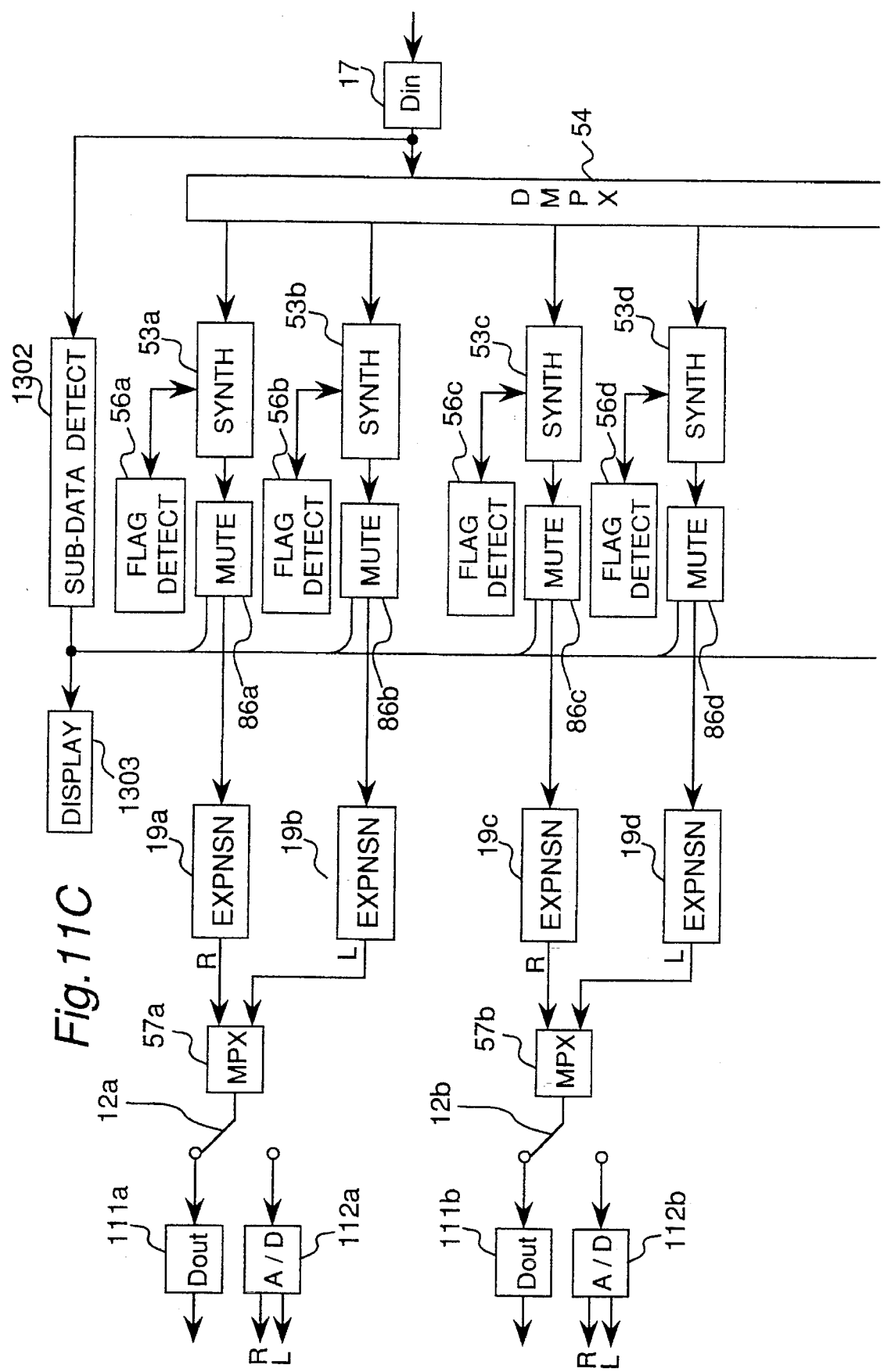

As shogun in FIGS. 11C–11D, the data expander portion further comprises a sub-data detector 1302 for detecting the portion of data in the sub-data section; a display 1303 for displaying the output of the sub-data detector 1302; and muting circuits 86a–86h. The display 1303 comprises an LED for displaying whether the data in the audio data sub-frame is linearly quantized digital audio data by lighting the LED when linearly quantized digital audio data is present and otherwise turning the LED off.

The display and muting operations of the apparatus shown in FIGS. 11A–11D are described below. Further description of operations common to the apparatus shown in FIGS. 5A–5D is omitted.

Because the data multiplexed to the audio data sub-frame is not linearly quantized digital audio data, the sub-data insertion circuit 1301 inserts this information to the sub-data section of the digital audio interface. In the data expander portion, the data input from the $D_{in}$ 17 is also input to the sub-data detector 1302, which references the portion of data in the sub-data section to determine whether the input data is linearly quantized digital audio data. If linearly quantized digital audio data is erroneously input, the display 1303 lights to notify the user of an input signal error. If the linearly quantized digital audio data is mistakenly expanded to a data block and output, noise signal may be produced. To prevent this, the muting circuits 86a–86h brakes the output signal.

By means of the first and second multiplexing methods applied in the first through sixth embodiments of the invention as described above, the number of channels of the digital audio interface and devices recording the digital audio interface can be easily increased while using an existing standardized digital audio interface. In addition, channel substitution can be freely executed without deteriorating the sound quality of the channels not replaced. Noise signal caused by data destruction in the transmission or recording/reproducing system can also be prevented. Improved ease of use and user-friendliness can also be achieved by displaying the input signal content and the multiplexed channel status to help eliminate operating errors.

It is to be noted that the above embodiments are described multiplexing data only to the audio data sub-frame of the AES/EBU digital audio interface, but the AUX section can also be used. Furthermore, the AES/EBU digital audio interface has been used by way of example only, and other digital audio interfaces can also be used.

Furthermore, both the data expander portion and data compressor portion are shown incorporated into a single apparatus in each of the embodiments described, but an apparatus may alternatively comprise only the data compressor portion or only the data expander portion.

Even when using data compression/expansion means using the data block concept, the present invention can, by means of the configurations described above, multiplex/demultiplex data to a digital audio interface without destroying the data blocks by using channel data or data block identification flags.

By connecting the apparatus of the invention to a digital recording and/or reproducing apparatus, multiple channels of digital audio data can be recorded and reproduced.

The invention also improves ease of use as described below.

First, by adding a channel substitution means, which is a second multiplexer, specific selected channels in the multiplexed data can be replaced without deteriorating the signal quality of the channels non replaced.

In addition, by monitoring the continuity and periodicity of the channel data or sub-block and displaying the monitored result, it can easily be known no which channels in the input multiplexed data is multiplexed and to which channel data is not multiplexed. By further muting signal output based on the monitor output, the output of noise can be prevented when the multiplexed data has been destroyed for some reason and the data blocks cannot be reconstructed.

In addition, by detecting the data identification flags of the sub-data section and displaying the detected result, it is also possible to know whether the received signal is linearly quantized digital audio data. The output of noise when linearly quantized digital audio data is received can also be prevented by similarly muting the output signal based on the detected result.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multiple channel demultiplexing apparatus for demultiplexing a multiplexed bit stream data to a plurality of channels of audio data, said multiplexed bit stream data being assembled in a predetermined format comprising a preamble area, audio data area and sub-data area, said audio data area carrying a plurality of data blocks of different channels, each data block being added with a channel data identifying a particular channel to which said data block is associated, said apparatus comprising:

channel data detection means for detecting the channel data added to each data block;

display means for displaying the channel data detected by said channel data detection means;

demultiplexing means for demultiplexing the received multiplexed bit stream to said plurality of data blocks and sending the data blocks to different channels based on the detected channel data; and data expansion means, provided for each of said different channels, for data expanding the demultiplexed data block to obtain audio data.

2. A multiple channel demultiplexing apparatus according to claim 1, further comprising:

muting means for muting the digital audio data a proper channel data is not detected by said channel detection means.

3. A multiple channel demultiplexing apparatus according to claim 1, wherein said channel data detection means detects the channel data separately for each channel, and said display means displays the channel data separately for each channel.

4. A multiple channel demultiplexing apparatus according to claim 1, further comprising a sub-data detection means for detecting a sub-data, indicating that said predetermined format is linearly quantized audio data, from each data block; and muting means for muting the audio data when said sub-data detection means detects said sub-data indicative of said linearly quantized audio data.

5. A multiple channel demultiplexing apparatus according to claim 1, further comprising a sub-data detection means for detecting a sub-data, indicating that said predetermined format is linearly quantized audio data, from each data block; and display means for displaying a condition when said sub-data detection means detects said sub-data indicative of said linearly quantized audio data.

6. A multiple channel demultiplexing apparatus according to claim 1, further comprising an input means adapted for connection with a digital reproducing apparatus.

7. A multiple channel multiplexing and demultiplexing apparatus for multiplexing and demultiplexing a plurality of channels of audio data to a bit stream data, said apparatus comprising:

(a) a multiplexing unit for producing a formatted and multiplexed bit stream data capable of being stored in a memory, comprising:

data compression means, provided for each of said plurality of channels, for compressing said audio data to a compressed data to form a data block;

channel data adding means, provided for each of said plurality of channels, for adding to said data block a channel data identifying a particular channel to which said data block is associated;

delay means for delaying said data block to sequentially release the data blocks from said plurality of channels;

multiplexing means for multiplexing the data blocks from said plurality of channels to form said bit stream data; and formatting means for formatting said multiplexed bit stream data to a predetermined format comprising a preamble area, audio data area and sub-data area, said data blocks from different channels being carried in said audio data area; and (b) a demultiplexing unit for receiving the formatted and multiplexed bit stream data from said memory, comprising:

channel data detection means for detecting the channel data added to each data block from said formatted and multiplexed bit stream data;

display means for displaying the channel data detected by said channel data detection means;

demultiplexing means for demultiplexing the received multiplexed bit stream to said plurality of data blocks and sending the data blocks to different channels based on the detected channel data; and data expansion means, provided for each of said different channels, for data expanding the demultiplexed data block to obtain audio data.

8. A multiple channel multiplexing and demultiplexing apparatus according to claim 7, further comprising:

channel selection means for selecting a particular channel.

9. A multiple channel multiplexing apparatus for multiplexing a plurality of channels of audio data to a bit stream data, said apparatus comprising:

data compression means, provided for each of said plurality of channels, for compressing said audio data to a compressed data to form a data block;

dividing means, provided to each of said plurality of channels, for dividing said data block into a predetermined number of sub-blocks;

flag adding means for adding a flag to said sub-blocks to distinguish leading sub-block in sub-blocks of one data block;

multiplexing means for multiplexing the sub-blocks from said plurality of channels to form said bit stream data such that the sub-blocks from different channels are aligned in a predetermined channel order, and the alignment is repeated; and formatting means for formatting said multiplexed bit stream data to a predetermined format comprising a preamble area, audio data area and sub-data area, said sub-blocks from different channels being carried in said audio data area at predetermined positions allocated to different channels.

10. A multiple channel multiplexing apparatus according to claim 9, further comprising an output means adapted for connection with a digital recording apparatus.

11. A multiple channel demultiplexing apparatus for demultiplexing a multiplexed bit stream data to a plurality of channels of audio data, said multiplexed bit stream data being assembled in a predetermined format comprising a preamble area, audio data area and sub-data area, said audio data area carrying a plurality of sub-blocks of different channels, said sub-blocks being added with a flag distinguishing a leading sub-block in sub-blocks of one data block, and said sub-blocks from different channels being aligned in a predetermined channel order, and the alignment being repeated, said sub-blocks from different channels being carried in said audio data area at predetermined positions allocated to different channels, said apparatus comprising:

demultiplexing means for demultiplexing the received multiplexed bit stream to said plurality of sub-blocks and sending the sub-blocks to different channels based on the position of the sub-block in each audio data area;

flag detection means for detecting the flag added to said sub-block and identifying said sub-block with the flag as a leading sub-block;

synthesizing means for synthesizing the sub-blocks sent along each of said different channels, starting from the leading sub-block until the sub-block sent immediately before the detection of a next flag, to form a demultiplexed data block; and data expansion means, provided for each of said different channels, for data expanding the demultiplexed data block to obtain audio data.

12. A multiple channel demultiplexing apparatus according to claim 11, further comprising:

muting means for muting the digital audio data when a proper flag is not detected by said flag detection means.

13. A multiple channel demultiplexing apparatus according to claim 11, further comprising a sub-data detection means for detecting a sub-data, indicating that said predetermined format is linearly quantized audio data, from each data block; and muting means for muting the audio data when said sub-data detection means fails to detect said sub-data.

14. A multiple channel demultiplexing apparatus according to claim 11, further comprising a sub-data detection means for detecting a sub-data, indicating that said predetermined format is linearly quantized audio data, from each data block; and display means for displaying a condition when said sub-data detection means fails to detect said sub-data.

15. A multiple channel demultiplexing apparatus according to claim 11, further comprising an input means adapted for connection with a digital reproducing apparatus.

16. A multiple channel demultiplexing apparatus according to claim 11, further comprising:

display means for displaying flag data detected by said flag detection means.

17. A multiple channel demultiplexing apparatus according to claim 16, wherein said flag detection means detects the flag separately for each channel, and said display means displays the flag data separately for each channel.

18. A multiple channel multiplexing and demultiplexing apparatus for multiplexing and demultiplexing a plurality of channels of audio data to a bit stream data, said apparatus comprising:

(a) a multiplexing unit for producing a formatted and multiplexed bit stream data capable of being stored in a memory, comprising:

data compression means, provided for each of said plurality of channels, for compressing said audio data to a compressed data to form a data block;

dividing means, provided to each of said plurality of channels, for dividing said data block into a predetermined number of sub-blocks;

flag adding means for adding a flag to said sub-blocks to distinguish a leading sub-block in sub-blocks of one data block;

multiplexing means for multiplexing the sub-blocks from said plurality of channels to form said bit stream data such that the sub-blocks from different channels are aligned in a predetermined channel order, and the alignment is repeated; and formatting means for formatting said multiplexed bit stream data to a predetermined format comprising a preamble area, audio data area and sub-data area, said sub-blocks from different channels being carried in said audio data area at predetermined positions allocated to different channels; and (b) a demultiplexing unit for receiving the formatted and multiplexed bit stream data from said memory, comprising:

demultiplexing means for demultiplexing the received multiplexed bit stream to said plurality of sub-blocks and sending the sub-blocks to different channels based on the position of the sub-block in each audio data area;

flag detection means for detecting the flag added to said sub-block and identifying said sub-block with the flag as the leading sub-block;

synthesizing means for synthesizing the sub-blocks sent along each of said different channels, starting from the leading sub-block until the sub-block sent immediately before the detection of a next flag, to form a demultiplexed data block; and data expansion means, provided for each of said different channels, for data expanding the demultiplexed data block to obtain audio data.

* * * * *